US011844119B2

(12) United States Patent
Zhu et al.

(10) Patent No.: US 11,844,119 B2
(45) Date of Patent: Dec. 12, 2023

(54) BLUETOOTH PAIRING METHOD AND RELATED APPARATUS

(71) Applicant: HUAWEI TECHNOLOGIES CO., LTD., Shenzhen (CN)

(72) Inventors: Yuhong Zhu, Shanghai (CN); Jingjing Zhang, Xi'an (CN); Yamei Du, Shenzhen (CN); Guanjun Ni, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/640,435

(22) PCT Filed: Sep. 3, 2020

(86) PCT No.: PCT/CN2020/113161
§ 371 (c)(1),
(2) Date: Mar. 4, 2022

(87) PCT Pub. No.: WO2021/043198
PCT Pub. Date: Mar. 11, 2021

(65) Prior Publication Data
US 2022/0346159 A1    Oct. 27, 2022

(30) Foreign Application Priority Data
Sep. 6, 2019 (CN) .......................... 201910844159.4

(51) Int. Cl.
*H04W 76/10* (2018.01)
*H04W 4/80* (2018.01)
(Continued)

(52) U.S. Cl.
CPC .......... *H04W 76/10* (2018.02); *G06F 3/0488* (2013.01); *H04W 4/80* (2018.02); *H04W 84/18* (2013.01)

(58) Field of Classification Search
CPC ....... G06F 3/0488; H04W 4/80; H04W 84/18; H04W 76/10; H04W 52/027; H04W 12/50; H04W 84/20
See application file for complete search history.

(56) References Cited

U.S. PATENT DOCUMENTS 9,042,829 B2 * 5/2015 Palin ..................... H04W 8/005
370/335
10,045,190 B2 * 8/2018 Lee ......................... H04W 4/80
(Continued)

FOREIGN PATENT DOCUMENTS

| CN | 102142980 A | 8/2011 |
| CN | 103686127 A | 3/2014 |
| CN | 103916163 A | 7/2014 |

OTHER PUBLICATIONS

Bluetooth Sig: "Bluetooth Specification Version 4.0—Excerpt of XP055574833", Jun. 30, 2010 (Jun. 30, 2010), pp. 1-58, XP055614175, Retrieved from the Internet: URL: https://www.bluetooth.com/specifications/archived-specifications, 40 pages.
(Continued)

*Primary Examiner* — Tuan H Nguyen
(74) *Attorney, Agent, or Firm* — RIMON P.C.

(57) ABSTRACT

This application relates to the field of short-range wireless communication technologies, and discloses a Bluetooth pairing method. The method includes: when a terminal receives a first operation of a user, the terminal sends an inquiry request to a Bluetooth device, where the inquiry request is used to obtain a Bluetooth address of the Bluetooth device. When receiving the inquiry request, the Bluetooth device sends an inquiry response to the terminal, where the inquiry response includes the Bluetooth address of the Bluetooth device. The Bluetooth device sends an extended inquiry response to the terminal, where the extended inquiry response includes a device name of the
(Continued)

Bluetooth device. After receiving the extended inquiry response, the terminal displays the device name of the Bluetooth device. In this way, the terminal can reduce a time consumed by the terminal in a process from discovering the Bluetooth device to pairing with the Bluetooth device.

15 Claims, 14 Drawing Sheets

(51) Int. Cl.
*G06F 3/0488* (2022.01)
*H04W 84/18* (2009.01)

(56) References Cited

U.S. PATENT DOCUMENTS

| | | |
|---|---|---|
| 2009/0047991 A1 | 2/2009 | Elg |
| 2009/0143014 A1 | 6/2009 | Honda et al. |
| 2011/0140883 A1 | 6/2011 | Yamashita |
| 2012/0256726 A1 | 10/2012 | Honkanen et al. |
| 2014/0364060 A1 | 12/2014 | Srivatsa et al. |

OTHER PUBLICATIONS

Sig Proprietary Bluetooth: "Bluetooth Sig Proprietary Bluetooth Core Specification v5.0", Dec. 6, 2016 (Dec. 6, 2016), pp. 1-2822, XP055567380, Retrieved from the Internet: URL: https://www.bluetooth.org/en-us/specification/adopted specifications, 2822 pages.

Nathan J. Muller, "Bluetooth Demystified," First Edition, Aug. 2001; 4 total pages.

Qian Zhihong, "Development and Application of Bluetooth Technology Principles," Sep. 22, 2013; 3 total pages.

* cited by examiner

BLUETOOTH PAIRING METHOD AND RELATED APPARATUS

CROSS-REFERENCE TO RELATED APPLICATIONS

This application is a national stage of International Application No. PCT/CN2020/113161, filed on Sep. 3, 2020, which claims priority to Chinese Patent Application No. 201910844159.4, filed on Sep. 6, 2019. Both of the aforementioned applications are hereby incorporated by reference in their entireties.

TECHNICAL FIELD

This application relates to the field of short-range wireless communication technologies, and in particular, to a Bluetooth pairing method and a related apparatus.

BACKGROUND

With the development of wireless communication technologies, people have become accustomed to connecting different intelligent terminal devices in a wireless manner. As a relatively mature short-range wireless communication technology currently, a Bluetooth technology is widely applied in intelligent terminal devices. For example, a terminal such as a smartphone is connected to a Bluetooth device such as a Bluetooth headset or a Bluetooth speaker through Bluetooth.

Currently, after a terminal such as a smartphone enables a Bluetooth function, the terminal may enter an inquiry state, and send an inquiry request to a surrounding device. After entering an inquiry scan state, the Bluetooth device may scan the inquiry request. After the inquiry request sent by the terminal is detected, the Bluetooth device may return an inquiry response to the terminal. The inquiry response includes a Bluetooth address of the Bluetooth device. Then, before the terminal is paired with the Bluetooth device, the terminal needs to send a remote name request to the Bluetooth device, to request to obtain a device name of the Bluetooth device. After receiving the remote name request, the Bluetooth device may return a remote name response to the terminal, where the remote name response includes the device name of the Bluetooth device. This takes a lot of time to complete the pairing.

SUMMARY

This application provides a Bluetooth pairing method and a related apparatus. After a Bluetooth device receives an inquiry request of a terminal, and returns an inquiry response, the Bluetooth device may return an extended inquiry response (EIR) carrying a device name of the Bluetooth device to the terminal. In this way, the terminal can quickly display the device name of the Bluetooth device, thereby reducing a time consumed by the terminal in a process from discovering the Bluetooth device to pairing with the Bluetooth device.

According to a first aspect, this application provides a Bluetooth pairing method, including: When the terminal receives a first operation of a user, the terminal sends an inquiry request to a Bluetooth device, where the inquiry request is used to obtain a Bluetooth address of the Bluetooth device. When receiving the inquiry request, the Bluetooth device sends an inquiry response to the terminal, where the inquiry response includes the Bluetooth address of the Bluetooth device. The Bluetooth device sends an extended inquiry response to the terminal, where the extended inquiry response includes the device name of the Bluetooth device. After receiving the extended inquiry response, the terminal displays the device name of the Bluetooth device.

According to the Bluetooth pairing method provided in this application, after the Bluetooth device receives the inquiry request of the terminal and returns the inquiry response, the Bluetooth device may return the extended inquiry response (EIR) carrying the device name of the Bluetooth device to the terminal. In this way, the terminal can quickly display the device name of the Bluetooth device, thereby reducing a time consumed by the terminal in a process from discovering the Bluetooth device to pairing with the Bluetooth device.

In a possible implementation, the extended inquiry response may further include information about a feature supported by the Bluetooth device. The information about a feature supported by the Bluetooth device includes secure simple pairing, 3-slot packet transmission, 5-slot packet transmission, timing accuracy, synchronous connection oriented link, and the like. In this way, the Bluetooth device may further send the feature information of the Bluetooth device to the terminal in the extended inquiry response, so that the terminal and the Bluetooth device can complete pairing and connection as soon as possible.

In a possible implementation, the method further includes: The terminal receives a second operation of the user. The terminal sends a page request to the Bluetooth device in response to the second operation. After receiving the page request, the Bluetooth device sends a first secondary device response to the terminal. After receiving the first secondary device response, the terminal sends a master device response to the Bluetooth device. The Bluetooth device switches to a connected state according to the received master device response, and sends a second secondary device response to the terminal. The terminal switches to a connected state based on the received second secondary device response.

In a possible implementation, the method further includes: The terminal completes pairing with the Bluetooth device after the terminal enters the connected state.

In a possible implementation, the extended inquiry response includes a first extended inquiry response data structure and a second extended inquiry response data structure. The first extended inquiry response data structure includes the device name of the Bluetooth device, and the second extended inquiry response data structure includes the information about a feature supported by the Bluetooth device.

According to a second aspect, this application provides a Bluetooth system, including a terminal and a Bluetooth device. The terminal is configured to: send an inquiry request to the Bluetooth device when receiving a first operation of a user, where the inquiry request is used to obtain a Bluetooth address of the Bluetooth device. The Bluetooth device is configured to: send an inquiry response to the terminal when receiving the inquiry request, where the inquiry response includes the Bluetooth address of the Bluetooth device. The Bluetooth device is further configured to send an extended inquiry response to the terminal, where the extended inquiry response includes the device name of the Bluetooth device. The terminal is further configured to: display the device name of the Bluetooth device after receiving the extended inquiry response.

According to the Bluetooth pairing method provided in this application, after the Bluetooth device receives the inquiry request of the terminal and returns the inquiry response, the Bluetooth device may return the extended inquiry response (EIR) carrying the device name of the Bluetooth device to the terminal. In this way, the terminal can quickly display the device name of the Bluetooth device, thereby reducing a time consumed by the terminal in a process from discovering the Bluetooth device to pairing with the Bluetooth device.

In a possible implementation, the extended inquiry response may further include information about a feature supported by the Bluetooth device. The information about a feature supported by the Bluetooth device includes secure simple pairing, 3-slot packet transmission, 5-slot packet transmission, timing accuracy, synchronous connection oriented link, and the like. In this way, the Bluetooth device may further send the feature information of the Bluetooth device to the terminal in the extended inquiry response, so that the terminal and the Bluetooth device can complete pairing and connection as soon as possible.

In a possible implementation, the terminal is further configured to receive a second operation of the user. The terminal is further configured to send a page request to the Bluetooth device in response to the second operation. The Bluetooth device is further configured to: send a first secondary device page response to the terminal after receiving the page request. The terminal is further configured to: send a master device page response to the Bluetooth device after receiving the first secondary device page response. The Bluetooth device is further configured to: switch to a connected state according to the received master device page response, and send a second secondary device response to the terminal. The terminal is further configured to switch to a connected state based on the received second secondary device response.

In a possible implementation, the terminal is further configured to complete pairing with the Bluetooth device after entering the connected state.

In a possible implementation, the extended inquiry response includes a first extended inquiry response data structure and a second EIR data structure. The first EIR data structure includes the device name of the Bluetooth device, and the second EIR data structure includes the information about a feature supported by the Bluetooth device.

According to a third aspect, this application provides a terminal, including a Bluetooth chip, a memory, a touchscreen, and a processor, where the memory is coupled to the processor. The touchscreen is configured to receive a first operation of a user. The processor is configured to: in response to the first operation received by the touchscreen, indicate the Bluetooth chip to send an inquiry request to a Bluetooth device, where the inquiry request is used to obtain a Bluetooth address of the Bluetooth device. The Bluetooth chip is configured to receive an inquiry response sent by the Bluetooth device, where the inquiry response includes the Bluetooth address of the Bluetooth device. The Bluetooth chip is further configured to receive an extended inquiry response sent by the Bluetooth device. The extended inquiry response includes a device name of the Bluetooth device. The processor is further configured to: after the Bluetooth chip receives the extended inquiry response, indicate the touchscreen to display the device name of the Bluetooth device.

According to the Bluetooth pairing method provided in this application, after the Bluetooth device receives the inquiry request of the terminal and returns the inquiry response, the Bluetooth device may return the extended inquiry response (EIR) carrying the device name of the Bluetooth device to the terminal. In this way, the terminal can quickly display the device name of the Bluetooth device, thereby reducing a time consumed by the terminal in a process from discovering the Bluetooth device to pairing with the Bluetooth device.

In a possible implementation, the extended inquiry response may further include information about a feature supported by the Bluetooth device. The information about a feature supported by the Bluetooth device includes secure simple pairing, 3-slot packet transmission, 5-slot packet transmission, timing accuracy, synchronous connection oriented link, and the like. In this way, the Bluetooth device may further send the feature information of the Bluetooth device to the terminal in the extended inquiry response, so that the terminal and the Bluetooth device can complete pairing and connection as soon as possible.

In a possible implementation, the touchscreen is further configured to receive a second operation of the user. The processor is further configured to indicate, in response to the second operation received by the touchscreen, the Bluetooth chip to send a page request to the Bluetooth device. The Bluetooth chip is further configured to receive a first secondary device page response sent by the Bluetooth device after the Bluetooth device receives the page request. The Bluetooth chip is further configured to: send a master device page response to the Bluetooth device after receiving the first secondary device page response, where the first secondary device page response is used for the Bluetooth device to switch to a connected state. The Bluetooth chip is further configured to receive a second secondary device response sent by the Bluetooth device after the Bluetooth device switches to the connected state. The Bluetooth chip is further configured to switch to a connected state based on the received second secondary device response.

In a possible implementation, the Bluetooth chip is further configured to complete pairing with the Bluetooth device after entering the connected state.

In a possible implementation, the extended inquiry response includes a first extended inquiry response data structure and a second EIR data structure. The first EIR data structure includes the device name of the Bluetooth device, and the second EIR data structure includes the information about a feature supported by the Bluetooth device.

According to a fourth aspect, this application provides a Bluetooth device, including a processor, a memory, and a Bluetooth chip, where the memory is coupled to the processor. The Bluetooth chip is configured to receive an inquiry request sent by a terminal, where the inquiry request is used to obtain a Bluetooth address of the Bluetooth device. The Bluetooth chip is further configured to send an inquiry response to the terminal, where the inquiry response includes the Bluetooth address of the Bluetooth device. The Bluetooth chip is further configured to send an extended inquiry response to the terminal, where the extended inquiry response includes a device name of the Bluetooth device.

According to the Bluetooth pairing method provided in this application, after the Bluetooth device receives the inquiry request of the terminal and returns the inquiry response, the Bluetooth device may return the extended inquiry response (EIR) carrying the device name of the Bluetooth device to the terminal. In this way, the terminal can quickly display the device name of the Bluetooth device, thereby reducing a time consumed by the terminal in a process from discovering the Bluetooth device to pairing with the Bluetooth device.

In a possible implementation, the extended inquiry response may further include information about a feature supported by the Bluetooth device. The information about a feature supported by the Bluetooth device includes secure simple pairing, 3-slot packet transmission, 5-slot packet transmission, timing accuracy, synchronous connection oriented link, and the like. In this way, the Bluetooth device may further send the feature (feature) information of the Bluetooth device to the terminal in the extended inquiry response, so that the terminal and the Bluetooth device can complete pairing and connection as soon as possible.

In a possible implementation, the Bluetooth chip is further configured to receive a page request sent by the terminal. The Bluetooth chip is further configured to send a first secondary device page response to the terminal. The Bluetooth chip is further configured to receive a master device page response sent by the terminal after the terminal receives the first secondary device page response. The Bluetooth chip is further configured to switch to a connected state, and send a second secondary device page response to the terminal. The second secondary device page response is used for the terminal to switch to a connected state.

In a possible implementation, the Bluetooth chip is further configured to complete pairing with the terminal after switching to the connected state.

The extended inquiry response includes a first extended inquiry response data structure and a second EIR data structure, where the first EIR data structure includes the device name of the Bluetooth device, and the second EIR data structure includes the information about a feature supported by the Bluetooth device.

According to a fifth aspect, this application provides a chip system. The chip system is disposed on a terminal, and the chip system includes a processor and a Bluetooth chip. The processor is configured to: when a touchscreen of the terminal receives a first operation of a user, indicate the Bluetooth chip to send an inquiry request to a Bluetooth device, where the inquiry request is used to obtain a Bluetooth address of the Bluetooth device. The Bluetooth chip is configured to receive an inquiry response sent by the Bluetooth device, where the inquiry response includes the Bluetooth address of the Bluetooth device. The Bluetooth chip is further configured to receive an extended inquiry response sent by the Bluetooth device, where the extended inquiry response includes a device name of the Bluetooth device. The processor is further configured to: after the Bluetooth chip receives the extended inquiry response, indicate the touchscreen of the terminal to display the device name of the Bluetooth device.

According to the Bluetooth pairing method provided in this application, after the Bluetooth device receives the inquiry request of the terminal and returns the inquiry response, the Bluetooth device may return the extended inquiry response (EIR) carrying the device name of the Bluetooth device to the terminal. In this way, the terminal can quickly display the device name of the Bluetooth device, thereby reducing a time consumed by the terminal in a process from discovering the Bluetooth device to pairing with the Bluetooth device.

In a possible implementation, the extended inquiry response may further include information about a feature supported by the Bluetooth device. The information about a feature supported by the Bluetooth device includes secure simple pairing, 3-slot packet transmission, 5-slot packet transmission, timing accuracy, synchronous connection oriented link, and the like. In this way, the Bluetooth device may further send the feature information of the Bluetooth device to the terminal in the extended inquiry response, so that the terminal and the Bluetooth device can complete pairing and connection as soon as possible.

In a possible implementation, the processor is further configured to indicate, in response to a second operation received by the touchscreen, the Bluetooth chip to send a page request to the Bluetooth device. The Bluetooth chip is further configured to receive a first secondary device page response sent by the Bluetooth device after the Bluetooth device receives the page request. The Bluetooth chip is further configured to: send a master device page response to the Bluetooth device after receiving the first secondary device page response, where the first secondary device page response is used for the Bluetooth device to switch to a connected state. The Bluetooth chip is further configured to receive a second secondary device response sent by the Bluetooth device after the Bluetooth device switches to the connected state. The Bluetooth chip is further configured to switch to a connected state based on the received second secondary device response.

In a possible implementation, the Bluetooth chip is further configured to complete pairing with the Bluetooth device after entering the connected state.

In a possible implementation, the extended inquiry response includes a first extended inquiry response data structure and a second EIR data structure. The first EIR data structure includes the device name of the Bluetooth device, and the second EIR data structure includes the information about a feature supported by the Bluetooth device.

According to a sixth aspect, this application provides a Bluetooth chip, and the Bluetooth chip is disposed on a Bluetooth device. The Bluetooth chip is configured to receive an inquiry request sent by a terminal, where the inquiry request is used to obtain a Bluetooth address of the Bluetooth device. The Bluetooth chip is further configured to send an inquiry response to the terminal, where the inquiry response includes the Bluetooth address of the Bluetooth device. The Bluetooth chip is further configured to send an extended inquiry response to the terminal, where the extended inquiry response includes a device name of the Bluetooth device.

According to the Bluetooth pairing method provided in this application, after the Bluetooth device receives the inquiry request of the terminal and returns the inquiry response, the Bluetooth device may return the extended inquiry response (EIR) carrying the device name of the Bluetooth device to the terminal. In this way, the terminal can quickly display the device name of the Bluetooth device, thereby reducing a time consumed by the terminal in a process from discovering the Bluetooth device to pairing with the Bluetooth device.

In a possible implementation, the extended inquiry response may further include information about a feature supported by the Bluetooth device. The information about a feature supported by the Bluetooth device includes secure simple pairing, 3-slot packet transmission, 5-slot packet transmission, timing accuracy, synchronous connection oriented link, and the like. In this way, the Bluetooth device may further send the feature information of the Bluetooth device to the terminal in the extended inquiry response, so that the terminal and the Bluetooth device can complete pairing and connection as soon as possible.

In a possible implementation, the Bluetooth chip is further configured to receive a page request sent by the terminal. The Bluetooth chip is further configured to send a first secondary device page response to the terminal. The Bluetooth chip is further configured to receive a master device page response sent by the terminal after the terminal receives the first secondary device page response. The Bluetooth chip is further configured to: switch to a connected state, and send a second secondary device page response to the terminal. The second secondary device page response is used for the terminal to switch to a connected state.

In a possible implementation, the Bluetooth chip is further configured to complete pairing with the terminal after switching to the connected state.

The extended inquiry response includes a first extended inquiry response data structure and a second EIR data structure, where the first EIR data structure includes the device name of the Bluetooth device, and the second EIR data structure includes the information about a feature supported by the Bluetooth device.

DESCRIPTION OF EMBODIMENTS

The following clearly describes the technical solutions in embodiments of this application in detail with reference to the accompanying drawings. In descriptions of embodiments of this application, unless otherwise stated, "I" indicates "or". For example, A/B may indicate A or B. The term "and/or" in this specification only describes an association relationship for describing associated objects, and indicates that three relationships may exist. For example, A and/or B may indicate the following three cases: Only A exists, both A and B exist, and only B exists. In addition, in the descriptions of embodiments of this application, "a plurality of" means two or more.

The terms "first" and "second" mentioned below are only intended for description, and shall not be understood as an indication or implication of relative importance or implicit indication of a quantity of indicated technical features. Therefore, a feature limited by "first" or "second" may explicitly or implicitly include one or more features. In the descriptions of embodiments of this application, unless otherwise specified, "a plurality of" means two or more.

The following describes an architecture of a system provided in an embodiment of this application.

Figure 1:
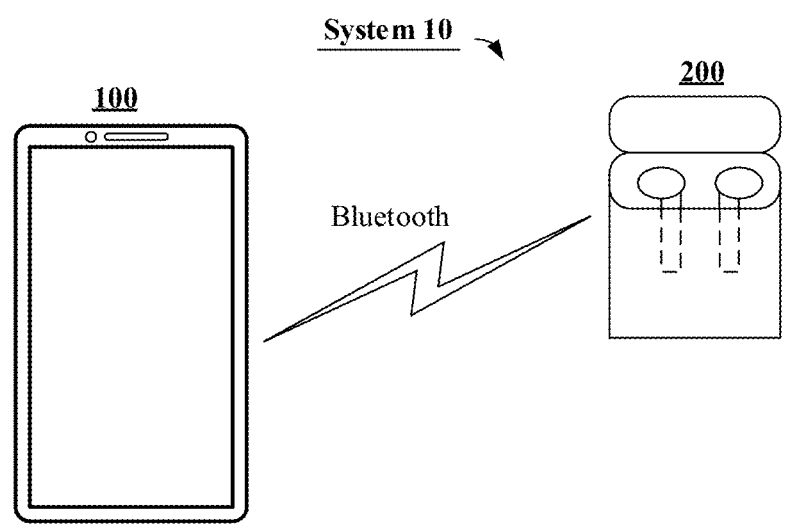
FIG. 1 is a schematic diagram of a system architecture according to an embodiment of this application.

FIG. 1 is a schematic architectural diagram of a system 10 according to an embodiment of this application. As shown in FIG. 1, the system 10 may include a terminal 100 and a Bluetooth device 200.

The terminal 100 may communicate with the Bluetooth device 200 by using a Bluetooth technology, including classic Bluetooth and Bluetooth low energy (BLE). The terminal 100 may be a terminal device such as a smartphone, a tablet computer, or a personal computer. The Bluetooth device 200 may be a device that supports a Bluetooth function, such as a Bluetooth headset, a Bluetooth speaker, or a smartwatch.

Figure 2A:
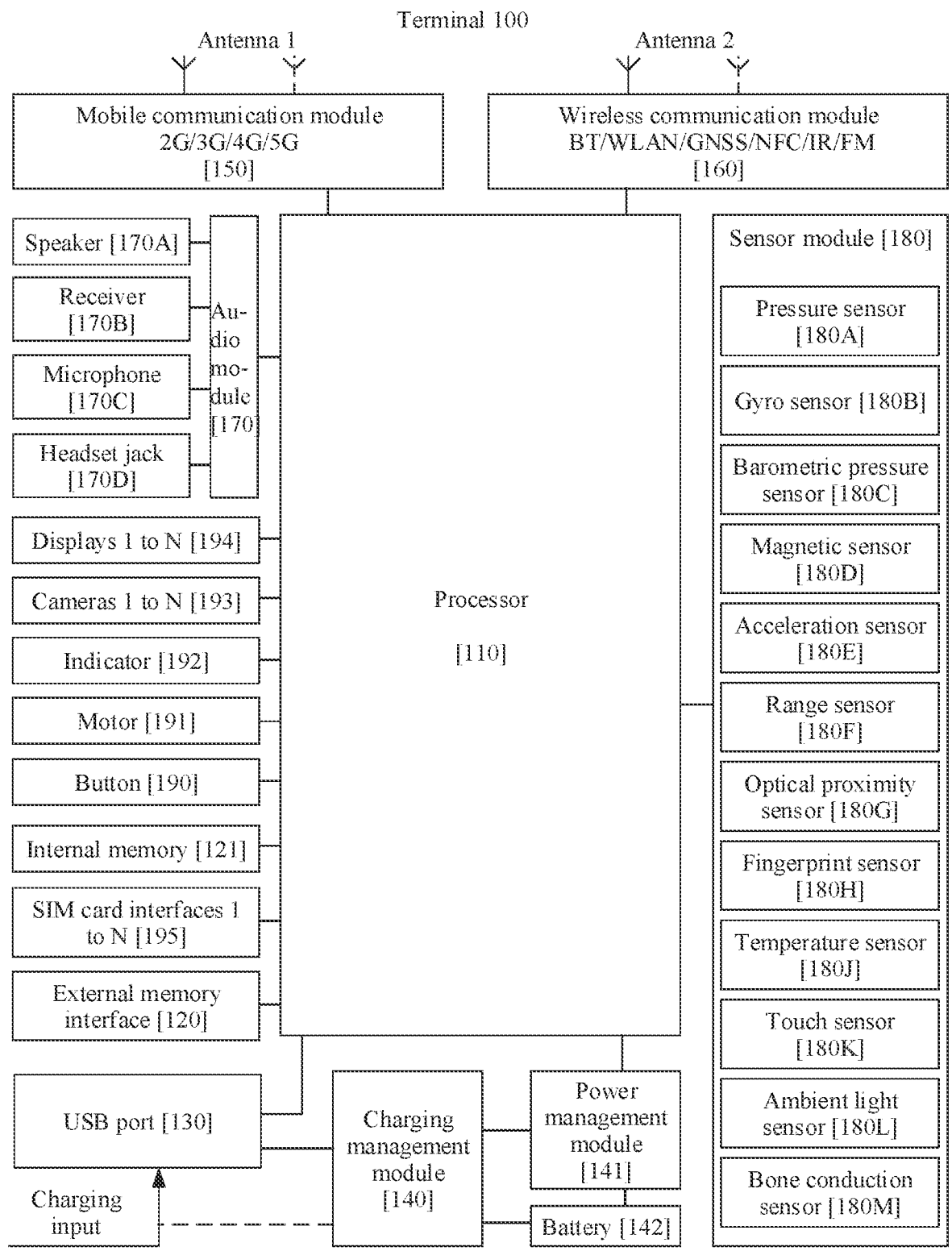
FIG. 2A is a schematic structural diagram of a terminal according to an embodiment of this application.

FIG. 2A is a schematic diagram of a structure of the terminal 100.

The following uses the terminal 100 as an example to describe embodiments in detail. It should be understood that the terminal 100 shown in FIG. 2A is only an example, and the terminal 100 may have more or fewer components than those shown in FIG. 2A, may have two or more components combined, or may have different component configurations. Various components shown in the figure may be implemented in hardware that includes one or more signal processing and/or application-specific integrated circuits, software, or a combination of hardware and software.

The terminal 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (SIM) card interface 195, and the like. The sensor module 180 may include a pressure sensor 180A, a gyroscope sensor 180B, a barometric pressure sensor 180C, a magnetic sensor 180D, an acceleration sensor 180E, a range sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in the embodiment of the present invention does not constitute any specific limitation on the terminal 100. In some other embodiments of this application, the terminal 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent devices, or may be integrated into one or more processors.

The controller may be a nerve center and a command center of the terminal 100. The controller may generate an operation control signal based on instruction operation code and a time sequence signal, to complete control of instruction reading and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access and reduces a waiting time of the processor 110, thereby improving system efficiency.

In some embodiments, the processor 110 may include one or more interfaces. The interfaces may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) port, and/or the like.

The I2C interface is a two-way synchronous serial bus, including a serial data line (SDA) and a serial clock line (SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K by using the I2C interface, so that the processor 110 communicates with the touch sensor 180K by using the I2C bus interface, to implement a touch function of the terminal 100.

The I2S interface may be used for audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transfer an audio signal to the wireless communication module 160 through the I2S interface, to implement a function of answering a call through a Bluetooth headset.

The PCM interface may also sample, quantize, and code an analog signal for audio communication. In some embodiments, the audio module 170 may be coupled to the wireless communication module 160 through a PCM bus interface. In some embodiments, the audio module 170 may alternatively transfer an audio signal to the wireless communication module 160 through the PCM interface, to implement a function of answering a call through a Bluetooth headset. Both the I2S interface and the PCM interface may be used for audio communication.

The UART interface is a universal serial data bus used for asynchronous communication. The bus may be a two-way communication bus. The bus converts to-be-transmitted data between a serial communication format and a parallel communication format. In some embodiments, the UART interface is usually used to connect the processor 110 to the wireless communication module 160. For example, the processor 110 communicates with a Bluetooth module in the wireless communication module 160 through the UART interface, to implement a Bluetooth function. In some embodiments, the audio module 170 may transfer an audio signal to the wireless communication module 160 through the UART interface, to implement a function of playing music through a Bluetooth headset.

The MIPI interface may be used to connect the processor 110 to a peripheral component such as the display 194 or the camera 193. The MIPI interface includes a camera serial interface (CSI), a display serial interface (DSI), and the like. In some embodiments, the processor 110 communicates with the camera 193 through the CSI interface, to implement a photography function of the terminal 100. The processor 110 communicates with the display 194 through the DSI interface, to implement a display function of the terminal 100.

The GPIO interface may be configured by using software. The GPIO interface may be configured as a control signal or a data signal. In some embodiments, the GPIO interface may be used to connect the processor 110 to the camera 193, the display 194, the wireless communication module 160, the audio module 170, the sensor module 180, or the like. The GPIO interface may alternatively be configured as an I2C interface, an I2S interface, a UART interface, an MIPI interface, or the like.

The USB interface 130 is an interface that complies with a USB standard specification, and may be specifically a mini USB interface, a micro USB interface, a USB Type-C interface, or the like. The USB interface 130 may be configured to connect to a charger to charge the terminal 100, and may also be configured to transmit data between the terminal 100 and a peripheral device, or may be configured to connect to a headset, to play audio through the headset. The interface may be further configured to connect to another terminal such as an AR device.

It may be understood that an interface connection relationship between the modules that is shown in this embodiment of the present invention is only an example for description, and does not constitute a limitation on the structure of the terminal 100. In some other embodiments, the terminal 100 may alternatively use an interface connection manner different from that in the foregoing embodiment, or a combination of a plurality of interface connection manners.

The charging management module 140 is configured to receive a charging input from the charger. The charger may be a wireless charger or a wired charger. In some embodiments of wired charging, the charging management module 140 may receive a charging input from the wired charger through the USB interface 130. In some embodiments of wireless charging, the charging management module 140 may receive a wireless charging input through a wireless charging coil of the terminal 100. When charging the battery 142, the charging management module 140 may further supply power to the terminal through the power management module 141.

The power management module 141 is configured to connect the battery 142 and the charging management module 140 to the processor 110. The power management module 141 receives an input of the battery 142 and/or the charging management module 140, and supplies power to the processor 110, the internal memory 121, an external memory, the display 194, the camera 193, the wireless communication module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the terminal 100 may be implemented by using the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna in the terminal 100 may be configured to cover one or more communication frequency bands. Different antennas may further be multiplexed to improve antenna utilization. For example, the antenna 1 may be multiplexed as a diversity antenna in a wireless local area network. In some other embodiments, an antenna may be used in combination with a tuning switch.

The mobile communication module 150 may provide a solution for wireless communication including 2G, 3G, 4G, 5G, and the like, applied to the terminal 100. The mobile communication module 150 may include at least one filter, a switch, a power amplifier, a low noise amplifier (LNA), and the like. The mobile communication module 150 may receive an electromagnetic wave through the antenna 1, perform processing such as filtering and amplification on the received electromagnetic wave, and transmit a processed electromagnetic wave to the modem processor for demodulation. The mobile communication module 150 may further amplify a signal modulated by the modem processor, and convert an amplified signal into an electromagnetic wave for radiation through the antenna 1. In some embodiments, at least some functional modules of the mobile communication module 150 may be disposed in the processor 110. In some embodiments, at least some functional modules of the mobile communication module 150 and at least some modules of the processor 110 may be disposed in a same device.

The modem processor may include a modulator and a demodulator. The modulator is configured to modulate a to-be-sent low-frequency baseband signal into a medium-high-frequency signal. The demodulator is configured to demodulate a received electromagnetic wave signal into a low-frequency baseband signal. Then, the demodulator transmits the low frequency baseband signal obtained through demodulation to the baseband processor for processing. After being processed by the baseband processor, the low-frequency baseband signal is transmitted to the application processor. The application processor outputs a sound signal through an audio device (which is not limited to the speaker 170A, the receiver 170B, or the like), or displays an image or a video through the display 194. In some embodiments, the modem processor may be an independent component. In some other embodiments, the modem processor may be independent of the processor 110, and is disposed in a same device as the mobile communication module 150 or another functional module.

The wireless communication module 160 may provide wireless communication solutions applicable to the terminal device 100, such as a wireless local area network (WLAN) (for example, a wireless fidelity (Wi-Fi) network), Bluetooth BT), a global navigation satellite system (GNSS), frequency modulation (FM), a near field communication (NFC) technology, an infrared (IR) technology, or the like. The wireless communication module 160 may be one or more components integrating at least one communication processor module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal. Then, the signal is converted into an electromagnetic wave for radiation through the antenna 2.

In some embodiments, in the terminal 100, the antenna 1 is coupled to the mobile communication module 150, and the antenna 2 is coupled to the wireless communication module 160, so that the terminal 100 can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The terminal 100 implements the display function through the GPU, the display 194, the application processor, and the like. The GPU is a microprocessor for image processing, and is connected to the display 194 and the application processor. The GPU is configured to perform mathematical and geometric calculation, and is configured to render an image. The processor 110 may include one or more GPUs that execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the terminal 100 may include one or N displays 194, where N is a positive integer greater than 1.

The terminal 100 can implement a photography function by using the ISP, the camera 193, the video codec, the GPU, the display 194, the application processor, and the like.

The ISP is configured to process data fed back by the camera 193. For example, during photography, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photography scenario. In some embodiments, the ISP may be disposed in the camera 193.

The camera 193 is configured to capture a static image or a video. An optical image of an object is generated through the lens, and is projected to the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as an RGB format or a YUV format. In some embodiments, the terminal 100 may include one or N cameras 193, where N is a positive integer greater than 1.

The digital signal processor is configured to process a digital signal, and may further process another digital signal in addition to a digital image signal. For example, when the terminal 100 selects a frequency, the digital signal processor is configured to perform Fourier transform, and the like on frequency energy.

The video codec is configured to compress or decompress a digital video. The terminal 100 may support one or more video codecs. In this way, the terminal 100 can play or record videos in a plurality of coding formats, for example, moving picture experts group (MPEG)-1, MPEG-2, MPEG-3, and MPEG-4.

The NPU is a neural-network (NN) computing processor, and quickly processes input information by referring to a biological neural network structure such as a mode of transmission between human-brain nerve cells, and may further constantly perform self-learning. Applications such as intelligent cognition of the terminal 100 may be implemented by using the NPU, for example, image recognition, facial recognition, speech recognition, and text understanding.

The external memory interface 120 may be configured to be connected to an external storage card such as a micro SD card, to extend a storage capability of the terminal 100. The external memory card communicates with the processor 110 through the external memory interface 120, to implement a data storage function. For example, files such as music and videos are stored in the external memory card.

The internal memory 121 may be configured to store computer-executable program code. The executable program code includes instructions. The processor 110 runs the instructions stored in the internal memory 121, to implement various function applications and data processing of the terminal 100. The internal memory 121 may include a program storage area and a data storage area. The program storage area may store an operating system, an application required by at least one function (for example, a sound playing function or an image playing function), and the like. The data storage area may store data (for example, audio data and an address book) created during use of the terminal 100, and the like. In addition, the internal memory 121 may include a high-speed random access memory, and may further include a nonvolatile memory, for example, at least one magnetic disk storage device, a flash memory device, or a universal flash storage (UFS).

The terminal 100 may implement audio functions such as music playing and recording through the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may be further configured to code and decode an audio signal. In some embodiments, the audio module 170 may be disposed in the processor 110, or some functional modules in the audio module 170 are disposed in the processor 110.

The speaker 170A, also referred to as a "loudspeaker", is configured to convert an audio electrical signal into a sound signal. The terminal 100 may play music by using a speaker 170A, or receive a hands-free call.

The receiver 170B, also referred to as an "earpiece", is configured to convert an audio electrical signal into a sound signal. When a call is answered or audio information is listened to by using the terminal 100, the receiver 170B may be put close to a human ear to listen to a voice.

The microphone 170C, also referred to as a "mike" or a "microphone", is configured to convert a sound signal into an electrical signal. When making a call or sending a voice message, a user may make a sound near the microphone 170C through the mouth of the user, to input a sound signal to the microphone 170C. At least one microphone 170C may be disposed in the terminal 100. In some other embodiments, two microphones 170C may be disposed in the terminal 100, to collect a sound signal and further implement a noise reduction function. In some other embodiments, three, four, or more microphones 170C may alternatively be disposed in the terminal 100, to collect a sound signal, reduce noise, further identify a sound source, implement a directional recording function, and the like.

The headset jack 170D is configured to connect to a wired headset. The headset jack 170D may be a USB interface 130, or may be a 3.5 mm open mobile terminal platform (OMTP) standard interface or cellular telecommunications industry association of the USA (CTIA) standard interface.

The pressure sensor 180A is configured to sense a pressure signal, and may convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The terminal 100 determines pressure strength based on a capacitance change. When a touch operation is performed on the display 194, the terminal 100 detects intensity of the touch operation by using the pressure sensor 180A. The terminal 100 may also calculate a touch position based on a detection signal of the pressure sensor 180A. In some embodiments, touch operations that are performed at a same touch location but have different touch operation strength may correspond to different operation instructions. For example, when a touch operation whose touch operation intensity is less than a first pressure threshold is performed on an SMS message application icon, an instruction for viewing an SMS message is performed. When a touch operation whose touch operation intensity is greater than or equal to the first pressure threshold is performed on the SMS message application icon, an instruction for creating a new SMS message is performed.

The gyro sensor 180B may be configured to determine a moving posture of the terminal 100. In some embodiments, angular velocities of the terminal 100 around three axes (namely, x, y, and z axes) may be determined by using the gyro sensor 180B. The gyroscope sensor 180B may be configured to perform image stabilization during photography. For example, when the shutter is opened, the gyro sensor 180B detects an angle at which the terminal 100 jitters, calculates, based on the angle, a distance for which a lens module needs to compensate, and allows the lens to cancel the jitter of the terminal 100 through reverse motion, to implement image stabilization. The gyro sensor 180B may be further used in a navigation scenario and a motion-sensing game scenario.

The barometric pressure sensor 180C is configured to measure barometric pressure. In some embodiments, the terminal 100 calculates an altitude by using a barometric pressure value measured by the barometric pressure sensor 180C, to assist positioning and navigation.

The magnetic sensor 180D includes a Hall effect sensor. The terminal 100 may detect opening and closing of a flip leather case by using the magnetic sensor 180D. In some embodiments, when the terminal 100 is a clamshell phone, the terminal 100 may detect opening and closing of a flip cover by using the magnetic sensor 180D. Further, a feature such as automatic unlocking upon opening of the flip cover is set based on a detected opening or closing state of the flip cover.

The acceleration sensor 180E may detect values of accelerations in various directions (usually on three axes) of the terminal 100. When the terminal 100 is still, a value and a direction of gravity may be detected. The acceleration sensor 180E may be further configured to identify a terminal posture, and is applied to applications such as screen switching between landscape and portrait modes and a pedometer.

The distance sensor 180F is configured to measure a distance. The terminal 100 may measure a distance through infrared light or a laser. In some embodiments, in a photography scenario, the terminal 100 may use the distance sensor 180F to measure a distance, to implement fast focusing.

The optical proximity sensor 180G may include, for example, a light-emitting diode (LED) and an optical detector such as a photodiode. The light-emitting diode may be an infrared light-emitting diode. The terminal 100 emits infrared light by using the light-emitting diode. The terminal 100 detects infrared reflected light from a nearby object by using the photodiode. When sufficient reflected light is detected, it may be determined that there is an object near the terminal 100. When insufficient reflected light is detected, the terminal 100 may determine that there is no object near the terminal 100. The terminal 100 may detect, by using the optical proximity sensor 180G, that the terminal 100 held by the user is close to an ear for a call, to automatically turn off a screen to save power. The optical proximity sensor 180G may also be used in a leather case mode or a pocket mode to automatically unlock or lock the screen.

The ambient light sensor 180L is configured to sense ambient light brightness. The terminal 100 may adaptively adjust brightness of the display 194 based on the sensed ambient light brightness. The ambient light sensor 180L may also be configured to automatically adjust white balance during photography. The ambient light sensor 180L may also cooperate with the optical proximity sensor 180G to detect whether the terminal 100 is in a pocket to prevent a false touch.

The fingerprint sensor 180H is configured to collect a fingerprint. The terminal 100 may use a feature of the collected fingerprint to implement fingerprint-based unlocking, application lock access, fingerprint-based photography, fingerprint-based call answering, and the like.

The temperature sensor 180J is configured to detect a temperature. In some embodiments, the terminal 100 executes a temperature processing policy based on a temperature detected by the temperature sensor 180J. For example, when the temperature reported by the temperature sensor 180J exceeds a threshold, the terminal 100 lowers performance of a processor located near the temperature sensor 180J, to reduce power consumption to implement thermal protection. In some other embodiments, when the temperature is lower than another threshold, the terminal 100 heats the battery 142 to prevent the terminal 100 from being shut down abnormally because of a low temperature. In some other embodiments, when the temperature is lower than still another threshold, the terminal 100 boosts an output voltage of the battery 142 to avoid abnormal shutdown caused by a low temperature.

The touch sensor 180K is also referred to as a touch panel. The touch sensor 180K may be disposed on the display 194, and the touch sensor 180K and the display 194 constitute a touchscreen. The touch sensor 180K is configured to detect a touch operation performed on or near the touch sensor. The touch sensor may transfer the detected touch operation to the application processor, to determine a type of a touch event. A visual output related to the touch operation may be provided through the display 194. In some other embodiments, the touch sensor 180K may also be disposed on a surface of the terminal 100 in a position different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse, and receive a blood pressure beating signal. In some embodiments, the bone conduction sensor 180M may also be disposed in the headset, to obtain a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The terminal 100 may receive a button input, and generate a button signal input related to user setting and function control of the terminal 100.

The motor 191 may generate a vibration prompt. The motor 191 may be configured to provide an incoming call vibration prompt or a touch vibration feedback. For example, touch operations performed on different applications (for example, photography and audio playback) may correspond to different vibration feedback effects. The motor 191 may also correspond to different vibration feedback effects for touch operations performed on different areas of the display 194. Different application scenarios (for example, a time reminder, information receiving, an alarm clock, a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or plugged from the SIM card interface 195, to implement contact with or separation from the terminal 100. The terminal 100 may support one or N SIM card interfaces, where N is a positive integer greater than 1. The SIM card interface 195 can support a Nano SIM card, a Micro SIM card, a SIM card, and the like. A plurality of cards may be simultaneously inserted into a same SIM card interface 195. The plurality of cards may be of a same type or of different types. The SIM card interface 195 is compatible with different types of SIM cards. The SIM card interface 195 is also compatible with an external storage card. The terminal 100 interacts with a network via a SIM card, to implement functions such as calling and data communication. In some embodiments, the terminal 100 uses an eSIM, namely, an embedded SIM card. The eSIM card may be embedded in the terminal 100, and cannot be separated from the terminal 100.

Figure 2B:
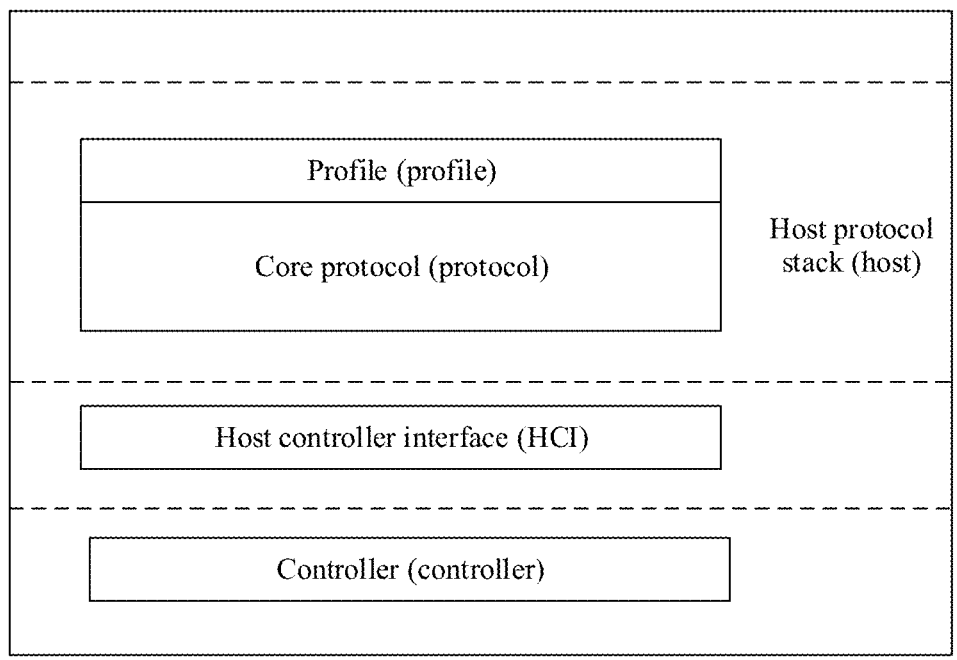
FIG. 2B is a schematic architectural diagram of a Bluetooth protocol according to an embodiment of this application.

As shown in FIG. 2B, an embodiment of this application provides a Bluetooth protocol framework, including but not limited to a host protocol stack (Host), a host controller interface (HCI), and a controller.

The host protocol stack defines a plurality of profiles and core protocols in the Bluetooth framework, each profile defines a corresponding message format and application rule, and the profile is a Bluetooth service (Application). For interconnection and interworking between different devices on different platforms, specifications for various possible and universal application scenarios are defined in the Bluetooth protocol, for example, the advanced audio distribution profile (A2DP), the hands-free profile (HFP), and the like.

The core protocols include but are not limited to the service discovery protocol (SDP), the logical link control and adaptation protocol (L2CAP), and the like. The core protocols are mandatory for the Bluetooth protocol stack.

The HCI provides an upper-layer protocol with a unified interface for entering a link manager and a unified manner for entering a baseband. There are several transport layers between the host core protocol stack and the controller. These transport layers are transparent and complete a task of transmitting data. The Bluetooth special interest group (SIG) defines four physical bus modes to connect to hardware, that is, four HCI transport layers: USB, RS232, UART, and PC card.

The controller defines a bottom-layer hardware part, including a radio frequency (RF), a baseband (BB), and a link manager (LM). An RF layer filters and transmits data bit streams by using microwaves on a 2.4 GHz unlicensed ISM band, and conditions for a Bluetooth transceiver to work properly on this frequency band are mainly defined. The baseband is responsible for frequency hopping and transmission of Bluetooth data and information frames. The link manager is responsible for connection, establishment, and disconnection of links, and security control. A link manager (LM) layer is a link manager layer protocol of the Bluetooth protocol stack, and is responsible for translating an upper-layer HCI command into an operation that can be accepted by a baseband, establishing an asynchronous link (ACL) and a synchronous link (SCO), enabling a Bluetooth device to enter a low-energy working mode, and the like. A link control (LC) layer is responsible for responding to an upper layer LM command (for example, LM commands for establishing a transmission link of a data packet, maintaining a link, and the like) during transmission of a batch of data packets.

According to the method described in this embodiment of this application, some steps implemented by the wireless communication module 160 of the terminal 100 shown in FIG. 2A may be specifically performed by a Bluetooth module or a Bluetooth chip.

Figure 3:
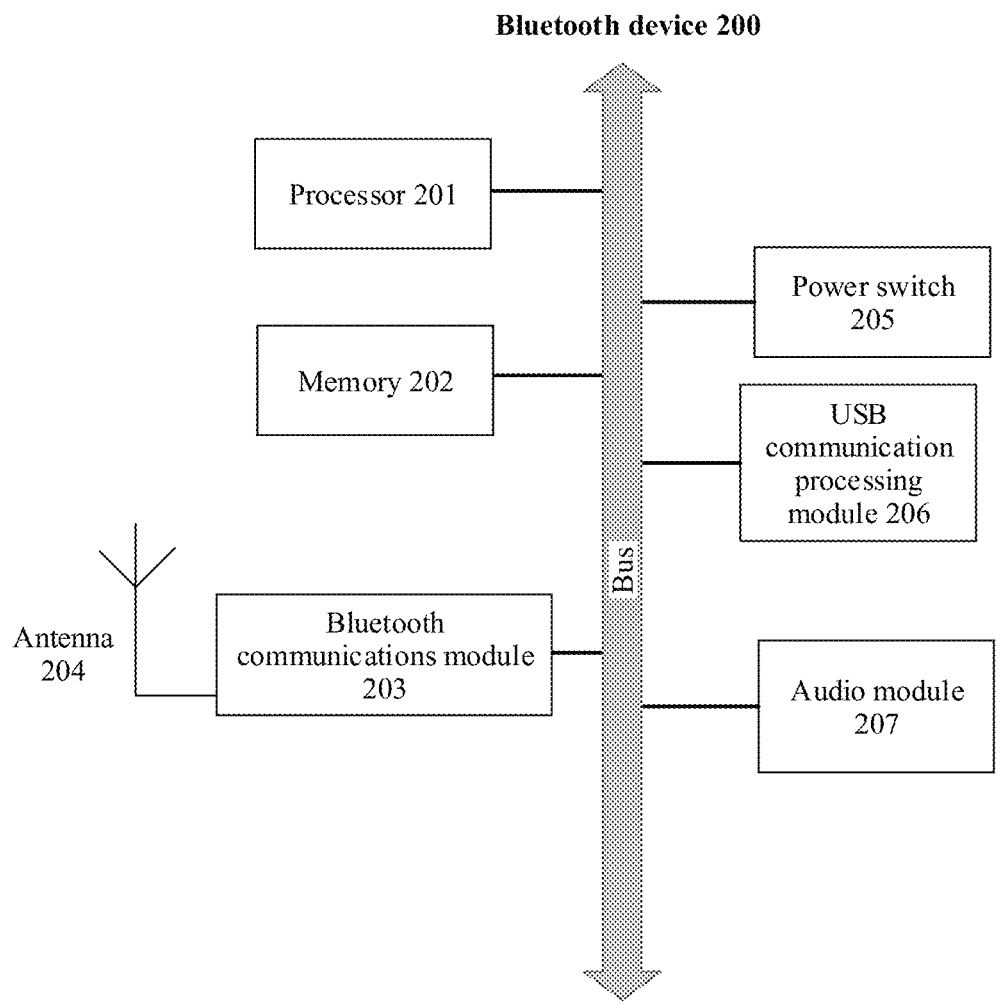
FIG. 3 is a schematic structural diagram of a Bluetooth device according to an embodiment of this application.

FIG. 3 is an example of a schematic structural diagram of a Bluetooth device 200 according to an embodiment of this application.

The following uses the Bluetooth device 200 as an example to describe the embodiment in detail. It should be understood that the Bluetooth device 200 shown in FIG. 3 is only an example, and the Bluetooth device 200 may have more or fewer components than those shown in FIG. 3, may have two or more components combined, or may have different component configurations. Various components shown in the figure may be implemented in hardware that includes one or more signal processing and/or application-specific integrated circuits, software, or a combination of hardware and software.

As shown in FIG. 3, the Bluetooth device 200 may include a processor 201, a memory 202, a Bluetooth communication module 203, an antenna 204, a power switch 205, a USB communication processing module 206, and an audio module 207.

The processor 201 may be configured to read and execute computer-readable instructions. During specific implementation, the processor 201 may mainly include a controller, an arithmetic unit, and a register. The controller is mainly responsible for decoding an instruction, and sends a control signal for an operation corresponding to the instruction. The arithmetic unit is mainly responsible for storing a register operand, an intermediate operation result, and the like that are temporarily stored during instruction execution. In specific implementation, a hardware architecture of the processor 201 may be an application-specific integrated circuit (ASIC) architecture, an MIPS architecture, an ARM architecture, an NP architecture, or the like.

In some embodiments, the processor 201 may be configured to parse a signal received by the Bluetooth communication processing module 203, for example, a pairing mode modification request sent by the terminal 100. The processor 201 may be configured to perform a corresponding processing operation according to a parsing result, for example, generate a pairing mode modification response.

The memory 202 is coupled to the processor 201, and is configured to store various software programs and/or a plurality of sets of instructions. In a specific implementation, the memory 202 may include a high-speed random access memory, and may further include a nonvolatile memory, for example, one or more magnetic disk storage devices, a flash memory device, or another nonvolatile solid-state storage device. The memory 202 may store an operating system, for example, an embedded operating system such as uCOS, VxWorks, or RTLinux. The memory 202 may further store a communication program. The communication program may be used to communicate with the terminal 100, one or more servers, or another device.

The Bluetooth communication module 203 may include a classic Bluetooth (BT) module and a Bluetooth low energy (BLE) module.

In some embodiments, the Bluetooth communication module 203 may listen for a signal transmitted by another device (for example, the terminal 100), such as a probe request or a scanning signal, and may send a response signal, a scanning response, or the like, so that the another device (for example, the terminal 100) can discover the Bluetooth device 200. The Bluetooth device 200 also establishes a wireless communication connection to the another device (for example, the terminal 100), and communicates with the another device (for example, the terminal 100) through Bluetooth.

In some other embodiments, the Bluetooth communication module 203 may also transmit a signal, for example, broadcast a BLE signal, so that another device (for example, the terminal 100) can discover the Bluetooth device 200. The Bluetooth device 200 also establishes a wireless communication connection to the another device (for example, the terminal 100), and communicates with the another device (for example, the terminal 100) through Bluetooth.

The wireless communication function of the Bluetooth device 200 may be implemented by using the antenna 204, the Bluetooth communication module 203, the modem processor, and the like.

The antenna 204 may be configured to transmit and receive an electromagnetic wave signal. Each antenna in the Bluetooth device 200 may be configured to cover one or more communication frequency bands.

In some embodiments, the Bluetooth communication module 203 may have one or more antennas.

The power switch 205 may be configured to control a power supply to supply power to the Bluetooth device 200.

The USB communication processing module 206 may be configured to communicate with another device through a USB interface (not shown).

The audio module 26 may be configured to output an audio signal through an audio output interface, so that the Bluetooth device 200 can support audio playback. The audio module may be further configured to receive audio data through an audio input interface. The Bluetooth device 200 may be a media playback device such as a Bluetooth headset.

In some embodiments, the Bluetooth device 200 may further include a display (not shown). The display may be configured to display an image, prompt information, and the like. The display may be a liquid crystal display (LCD), an organic light-emitting diode (OLED) display, an active-matrix organic light emitting diode (AMOLED) display, a flexible light-emitting diode (FLED) display, a quantum dot light emitting diode (QLED) display, or the like.

In some embodiments, the Bluetooth device 200 may further include a serial interface such as an RS-232 interface. The serial interface may be connected to another device, for example, an audio loudspeaker device such as a speaker, so that the Bluetooth device 200 and the audio loudspeaker device cooperatively play audio and video.

It may be understood that the structure shown in FIG. 3 does not constitute any specific limitation on the Bluetooth device 200. In some other embodiments of this application, the Bluetooth device 200 may include more or fewer components than those shown in the figure, or some components may be combined, or some components may be split, or different component arrangements may be used. The components shown in the figure may be implemented by hardware, software, or a combination of software and hardware.

In the method described in this embodiment of this application, for the Bluetooth protocol framework used by the Bluetooth device, refer to FIG. 2B. Details are not described herein again.

In a related technology, before the terminal 100 performs authentication for pairing with the Bluetooth device 200, the terminal 100 needs to obtain a device name of the Bluetooth device 200. After the terminal 100 obtains the device name of the Bluetooth device 200, the terminal 100 may display the device name of the Bluetooth device 200 on the Bluetooth setting interface, so that a user triggers the terminal 100 to complete authentication for pairing with the Bluetooth device 200.

Figure 4:
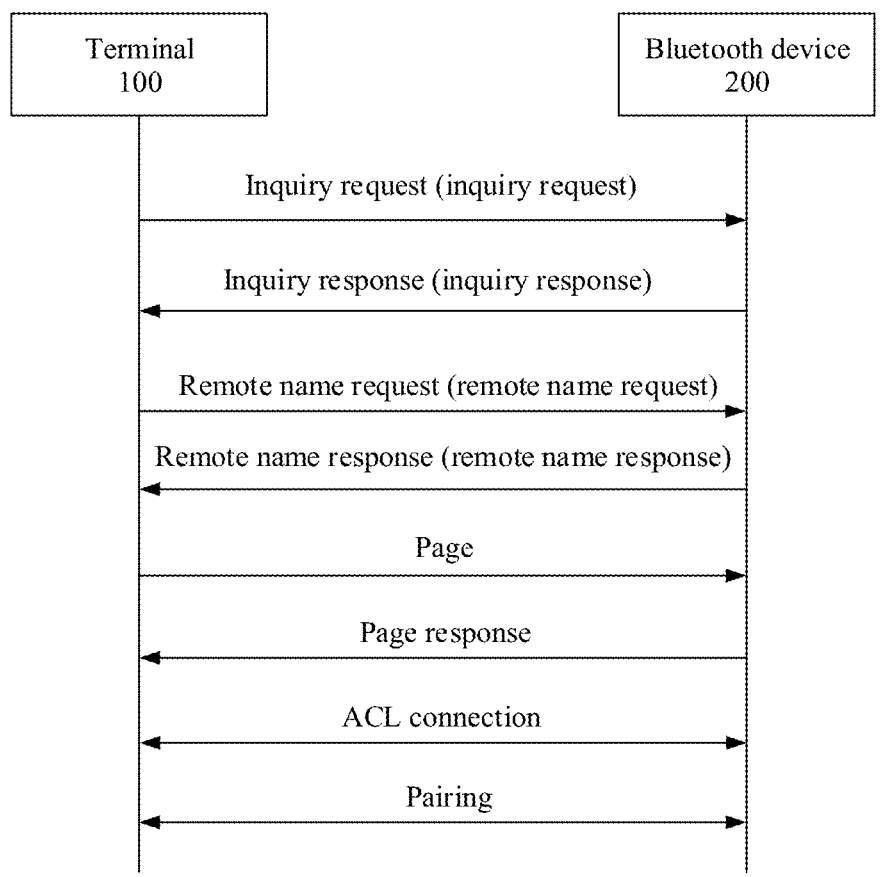
FIG. 4 is a schematic flowchart of a Bluetooth pairing procedure in a related technology of this application.

As shown in FIG. 4, in the existing Bluetooth standard protocol, before the terminal 100 completes authentication for pairing with the Bluetooth device 200, the following process is performed:

1. The terminal 100 sends an inquiry request to the Bluetooth device 200.

After the terminal 100 enables the Bluetooth function, the terminal 100 may enter an inquiry state. After entering the inquiry state, the terminal 100 may select a new frequency to send an inquiry request at a specified interval (for example, 312.5 μs). The inquiry request includes a Bluetooth address (BD_ADDR) of the terminal 100. If a device near the terminal 100 is in a discoverable state, a new frequency may be selected for listening at a specified interval (for example, 1.28 s). The terminal 100 (inquiry device) and the nearby device (inquired device) may use a low address part (LAP) of a general inquiry access code (GIAC) as an inquiry address. After the inquiry request sent by the terminal 100 is received, an inquiry response may be sent to the terminal 100 according to the Bluetooth address of the terminal 100 in the inquiry request.

2. The Bluetooth device 200 sends the inquiry response to the terminal 100.

After entering an inquiry scan state, the Bluetooth device 200 may scan for an inquiry request sent by a surrounding device. After receiving the inquiry request sent by the terminal 100, the Bluetooth device 200 may return the inquiry response to the terminal 100 according to the Bluetooth address of the terminal 100 in the inquiry request. The inquiry response includes a Bluetooth address of the Bluetooth device 200.

3. The terminal 100 sends a remote name request to the Bluetooth device 200, to request the Bluetooth device 200 to send a device name of the Bluetooth device 200 to the terminal 100.

4. The Bluetooth device 200 sends a remote name response to the terminal 100. The remote name response carries the device name of the Bluetooth device 200.

Before the terminal 100 sends the remote name request to the Bluetooth device 200, because no connection is established between the terminal 100 and the Bluetooth device 200, the terminal 100 needs to obtain a supported feature of the Bluetooth device 200. Therefore, the terminal 100 needs to send a feature request/extended feature request to the Bluetooth device 200, to request to obtain device feature information of the Bluetooth device 200. The feature request or the extended feature request includes device supported feature information of the terminal 100. After receiving the device feature request/extended feature request sent by the terminal 100, the Bluetooth device 200 may return a feature response/extended feature response to the terminal 100. The feature response/extended feature response includes the device supported feature information of the Bluetooth device 200.

The terminal 100 obtains information about a feature supported by the Bluetooth device 200 for connection and interworking between the terminal 100 and the Bluetooth device 200. The information about a feature supported by the Bluetooth device 200 may include whether the following features are supported: 3 slot packets, 5 slot packets, encryption, slot offset, timing accuracy, role switch, hold mode, sniff mode, power control request, channel quality driven data rate (CQDDR), synchronous connection oriented link, secure simple pairing, and the like.

For descriptions of device-supported features, refer to the device feature part in the Bluetooth protocol Core_5.0 Vol2 Part C. Details are not described herein again.

5. The terminal 100 pages the Bluetooth device 200.

After obtaining the device name of the Bluetooth device 200, the terminal 100 may display the device name of the Bluetooth device 200 in the available device list on the Bluetooth setting interface. The terminal 100 may receive a selection operation performed by a user for an option corresponding to the Bluetooth device 200 in the available device list. In response to the selection operation, the terminal 100 may perform carrier frequency hopping based on a paging hopping sequence, and send a page request to the Bluetooth device 200 in a sending interval, to request the Bluetooth device 200 to join a piconet where the terminal 100 is located. The paging hopping sequence is generated by using 28 least significant bits of the Bluetooth address of the paged device.

6. The Bluetooth device 200 returns a page response to the terminal 100.

The Bluetooth device 200 may listen for a page request of the terminal 100 at a specific hopping frequency in a fixed time window at a regular interval. After detecting the page request sent by the terminal 100, the Bluetooth device 200 may send a secondary device page response (slave page response) to the terminal 100 in a next interval. After receiving the secondary device page response from the Bluetooth device 200, the terminal 100 may send a master device page response (master page response) in a next interval.

7. The terminal 100 establishes an asynchronous connectionless (ACL) connection to the Bluetooth device 200.

After completing paging with the Bluetooth device 200, the terminal 100 may establish the ACL connection. After the ACL connection is established, a logical link control and adaptation protocol (L2CAP) signaling channel (channel ID CID=0x0001) between the terminal 100 and the Bluetooth device 200 exists. The terminal 100 and the Bluetooth device 200 may transmit control signaling and some data over the L2CAP signaling channel. The terminal 100 may establish an L2CAP connection to the Bluetooth device 200 through the L2CAP signaling channel.

8. The terminal 100 and the Bluetooth device 200 complete authentication for pairing.

The pairing between the terminal 100 and the Bluetooth device 200 may be link manager protocol (LMP) pairing, secure simple pairing (SSP), or another non-standard pairing. After the pairing between the terminal 100 and the Bluetooth device 200 is completed, a shared key, that is, a link key may be created. The link key can be used for mutual authentication between devices and encrypt data to be exchanged.

After the terminal 100 is paired with the Bluetooth device 200, the terminal 100 and the Bluetooth device 200 share a same link key. Then, the terminal 100 and the Bluetooth device 200 may use the link key to perform identity authentication. After the identity authentication is completed, the terminal 100 and the Bluetooth device 200 may derive an encryption key by using the link key and a random number that is exchanged recently before encrypted communication. Then, the terminal 100 and the Bluetooth device 200 may encrypt, by using the encryption key, data to be transmitted between the terminal 100 and the Bluetooth device 200.

It can be learned from the foregoing related technologies that, before performing pairing, the terminal 100 needs to first send the remote name request to the Bluetooth device 200, to request to obtain the device name of the Bluetooth device 200. Then, the Bluetooth device 200 returns the remote name response carrying the device name of the Bluetooth device 200 to the terminal 100. As a result, the entire Bluetooth pairing process takes an excessively long time.

Therefore, this application provides a Bluetooth pairing method: After the Bluetooth device 200 enters an inquiry scan state and then detects an inquiry request of the terminal 100, the Bluetooth device 200 returns an extended inquiry response (EIR) to the terminal 100. The extended inquiry response may carry the device name of the Bluetooth device 200. Instead of obtaining the device name of the Bluetooth device 200 through a remote device name request (remote name request) in the related technology, this application obtains the device name of the Bluetooth device 200 through the extended inquiry response, and obtains device-supported feature information through exchanging a feature request/extended feature request and a feature response/extended feature response. This can reduce time consumed in the pairing process between the terminal 100 and the Bluetooth device 200.

The following describes a Bluetooth pairing method provided in this application.

Figure 5:
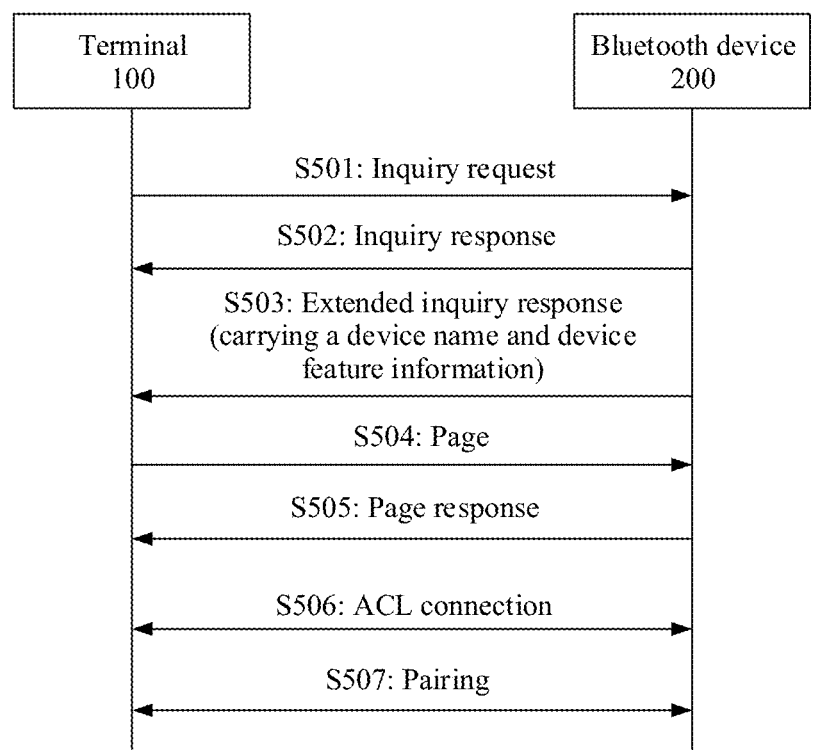
FIG. 5 is a schematic flowchart of a Bluetooth pairing method according to an embodiment of this application.

FIG. 5 shows a Bluetooth pairing method according to an embodiment of this application. As shown in FIG. 5, the method includes the following steps.

S501: The terminal 100 sends an inquiry request to the Bluetooth device 200.

First, the terminal 100 may receive an input operation of a user to enable a Bluetooth function. In this embodiment of this application, the operation of enabling the Bluetooth function by the user may be referred to as a first operation.

Figure 6A:
FIG. 6A to FIG. 6G are schematic diagrams of a group of interfaces according to an embodiment of this application.

For example, as shown in FIG. 6A, the terminal 100 displays a home screen interface 610, and the interface 610 displays a page on which application icons are placed, the page includes a plurality of application icons (for example, a weather application icon, a stock application icon, a calculator application icon, a setting application icon 616, an email application icon, an Alipay application icon, a Facebook application icon, a browser application icon, a gallery application icon, a music application icon, a video application icon, and an application store icon). Page indicators are further displayed below the application icons, to indicate a position relationship between a currently displayed page and another page. There are a plurality of tray icons (for example, a dial-up application icon, a message application icon, a contact application icon, and a camera application icon) below the page indicators. The tray icons remain displayed during page switching. The page may also include a plurality of application icons and page indicators. Alternatively, the page indicators may exist independently, instead of being a part of the page. The tray icons are also optional. This is not limited in embodiments of this application. A status bar 611 is displayed in the upper part of the interface 610. The status bar 611 may include: one or more signal strength indicators of a mobile communication signal (which may also be referred to as a cellular signal), one or more signal strength indicators of a wireless fidelity (Wi-Fi) signal, a battery status indicator, a time indicator, and so on. A navigation bar 612 is displayed below the tray icons. The navigation bar 612 may include system navigation buttons such as a return button 613, a home screen button 614, and a recent task history button 615. When detecting that the user taps the return button 613, the terminal 100 may display a previous page of the current page. When detecting that the user taps the home screen button 614, the terminal 100 may display the home screen. When detecting that the user taps the recent task history button 615, the terminal 100 may display a task recently opened by the user. Names of the navigation buttons may alternatively be other names. This is not limited in this application. Not limited to a virtual button, each navigation button in the navigation bar 612 may alternatively be implemented as a physical button.

The terminal 100 may receive an input operation (for example, tapping) performed by the user on the setting icon 616. In response to the input operation on the setting icon 616, the terminal 100 may display a setting interface 620 shown in FIG. 6B.

Figure 6B:
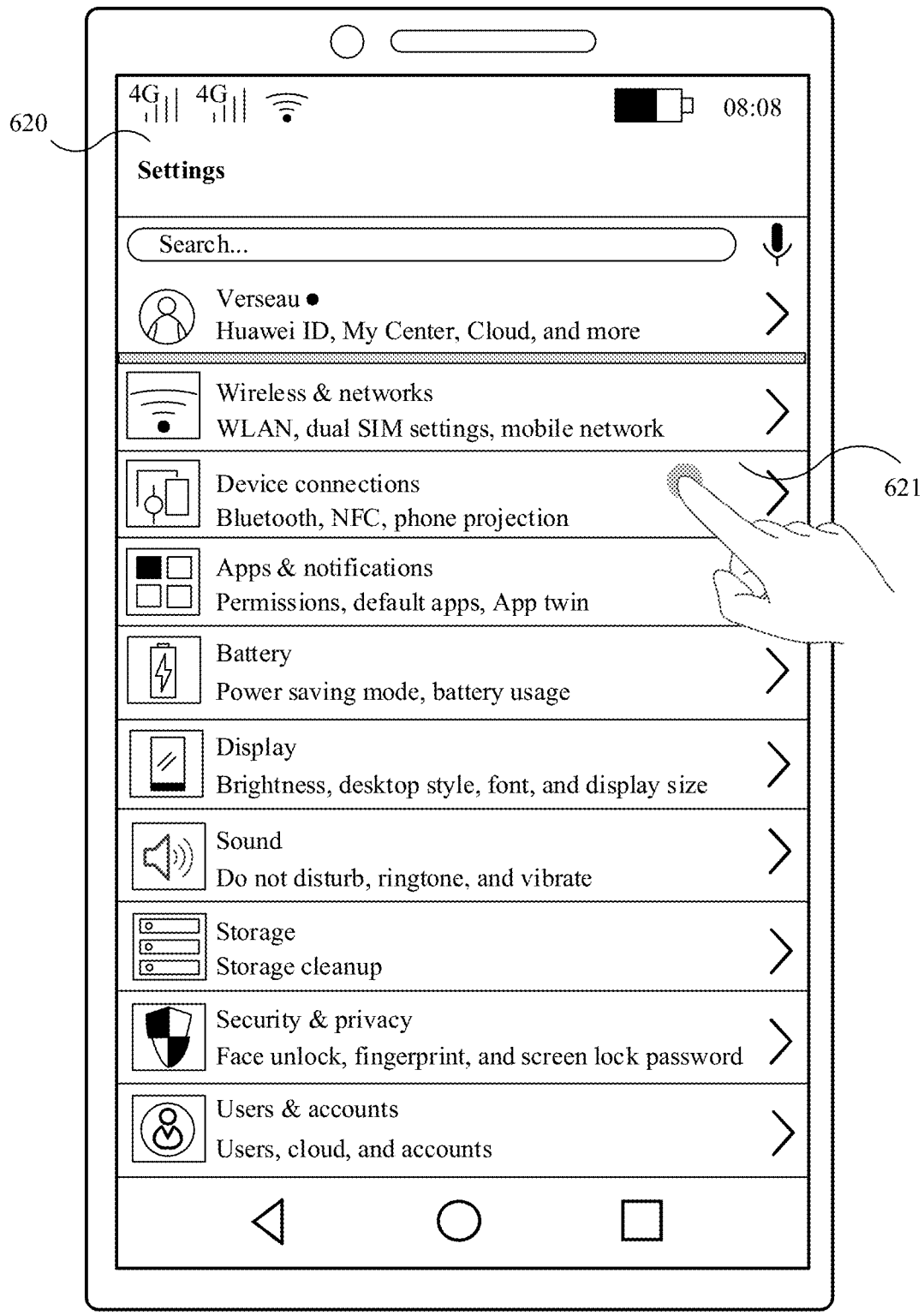

As shown in FIG. 6B, the setting interface 620 displays a wireless and network setting option, a device connection setting option 621, an application and notification setting option, a battery setting option, a display setting option, a sound setting option, a storage setting option, a security and privacy setting option, a user and account setting option, and the like.

The terminal 100 may receive an input operation (for example, tapping) performed by the user on the device connection option 621. In response to the input operation on the device connection option 621, the terminal 100 may display a device connection interface 630 shown in FIG. 6C.

Figure 6C:
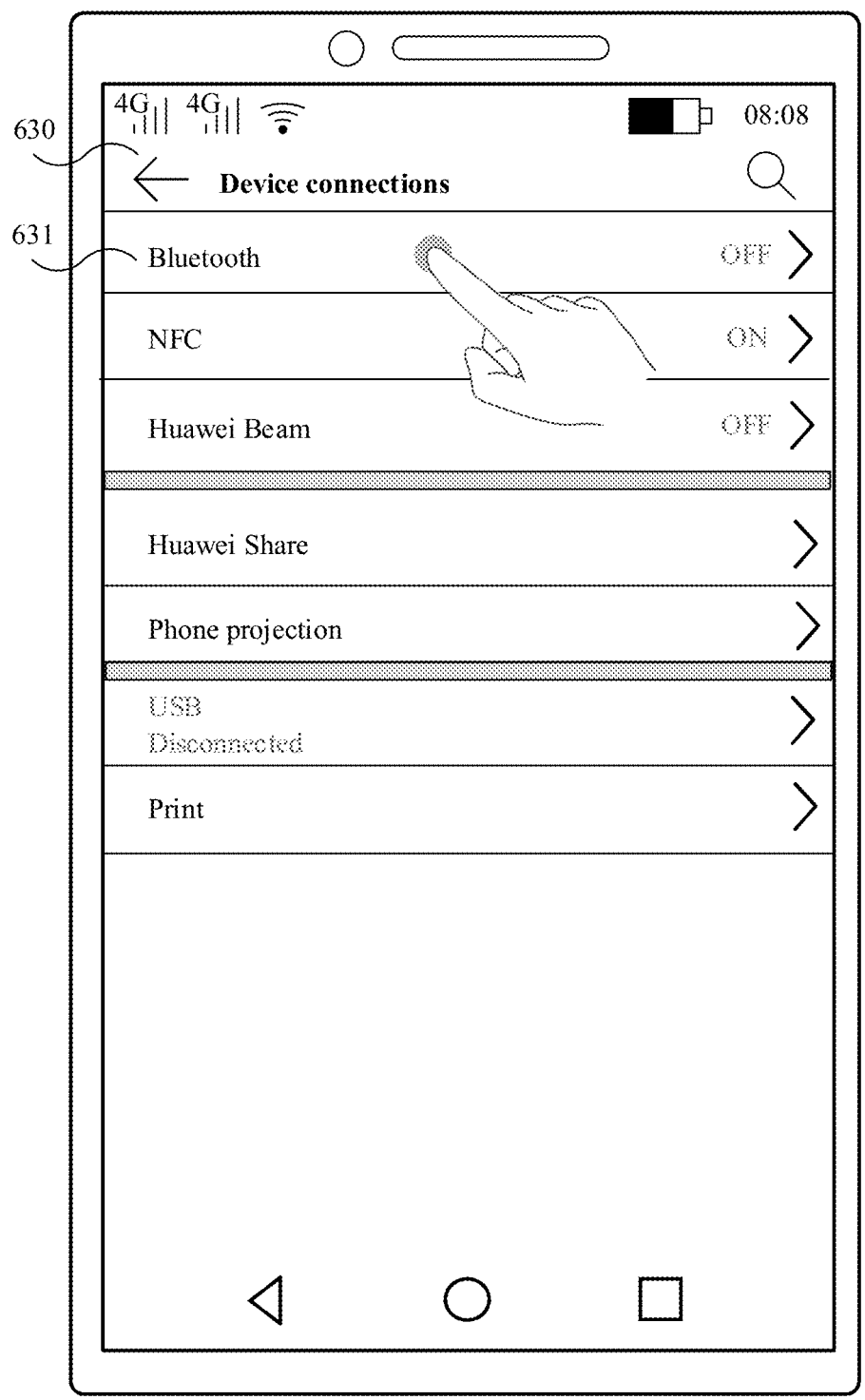

As shown in FIG. 6C, the device connection interface 630 displays a Bluetooth setting option 631, an NFC setting option, a Huawei Beam setting option, a Huawei Share setting option, a mobile phone projection setting option, a USB setting option, a print setting option, and the like.

The terminal 100 may receive an input operation performed by the user on the Bluetooth setting option 631 in the device connection interface 630. In response to the input operation on the Bluetooth setting option 631, the terminal 100 may display a Bluetooth setting interface 640 shown in FIG. 6D.

Figure 6D:
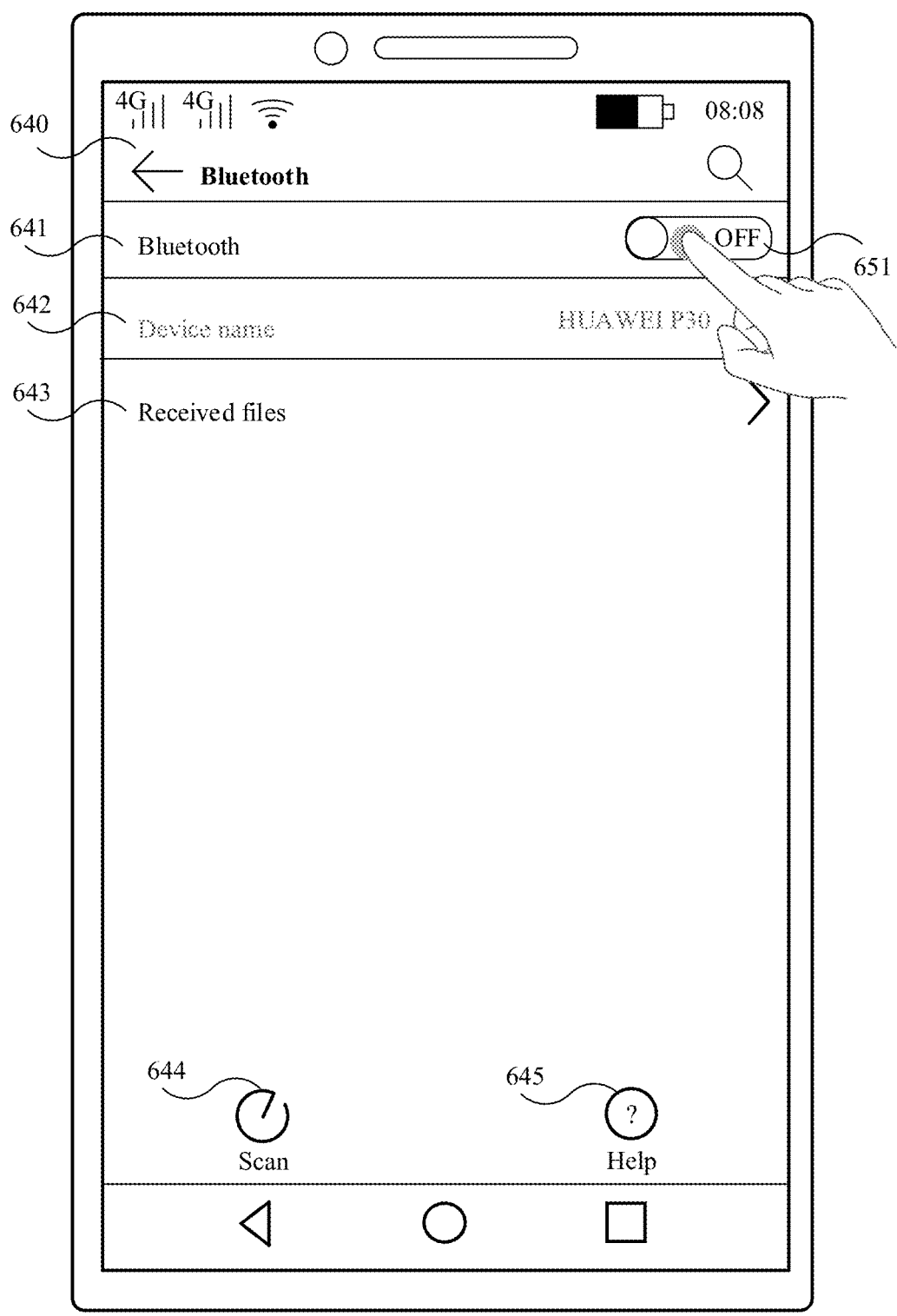

As shown in FIG. 6D, the Bluetooth setting interface 640 displays a Bluetooth switch option 641, a device name setting option 642, a file receiving setting option 643, a scanning control 644, and a help control 645. The Bluetooth switch option 641 displays a Bluetooth switch 651. The Bluetooth switch 651 may be configured to receive a user operation to trigger the terminal 100 to enable/disable a Bluetooth function.

For example, when the Bluetooth switch 651 is currently in an off state, the terminal 100 may receive an input operation (for example, tapping) performed by the user on the Bluetooth switch 651. In response to the input operation on the Bluetooth switch 651, the terminal 100 may enable the Bluetooth function.

After the terminal 100 enables the Bluetooth function, the terminal 100 may enter an inquiry state. After entering the inquiry state, the terminal 100 may select a new frequency to send an inquiry request at a specified interval (for example, 312.5 µs). The inquiry request includes a Bluetooth address (BD_ADDR) of the terminal 100. If a device near the terminal 100 is in a discoverable state, a new frequency may be selected for listening at a specified interval (for example, 1.28 s). The terminal 100 (inquiry device) and the nearby device (inquired device) may use a low address part (LAP) of a general inquiry access code (GIAC) as an inquiry address. After the inquiry request sent by the terminal 100 is received, an inquiry response may be sent to the terminal 100 according to the Bluetooth address of the terminal 100 in the inquiry request.

S502: The Bluetooth device 200 returns the inquiry response to the terminal 100.

After entering an inquiry scan state, the Bluetooth device 200 may scan for an inquiry request sent by a surrounding device. After receiving the inquiry request sent by the terminal 100, the Bluetooth device 200 may return the inquiry response to the terminal 100 according to the Bluetooth address of the terminal 100 in the inquiry request. The inquiry response includes a Bluetooth address of the Bluetooth device 200.

In this embodiment of this application, the Bluetooth device 200 may enter the inquiry scan state as triggered by an input operation of the user. For example, when the Bluetooth device 200 is in a power-off state, the Bluetooth device 200 may receive an input operation (for example, pressing and holding a power button for more than 8 seconds) performed by the user on the power button. In response to the input operation on the power button, the Bluetooth device 200 may be powered on and enter the inquiry scan state.

S503: The Bluetooth device 200 returns an extended inquiry response to the terminal 100. The extended inquiry response may carry a device name and device supported features information of the Bluetooth device 200.

After returning the inquiry response to the terminal 100, the Bluetooth device 200 may send the extended inquiry response (EIR) to the terminal 100 by using an inquiry response frequency hopping sequence.

Figure 7:
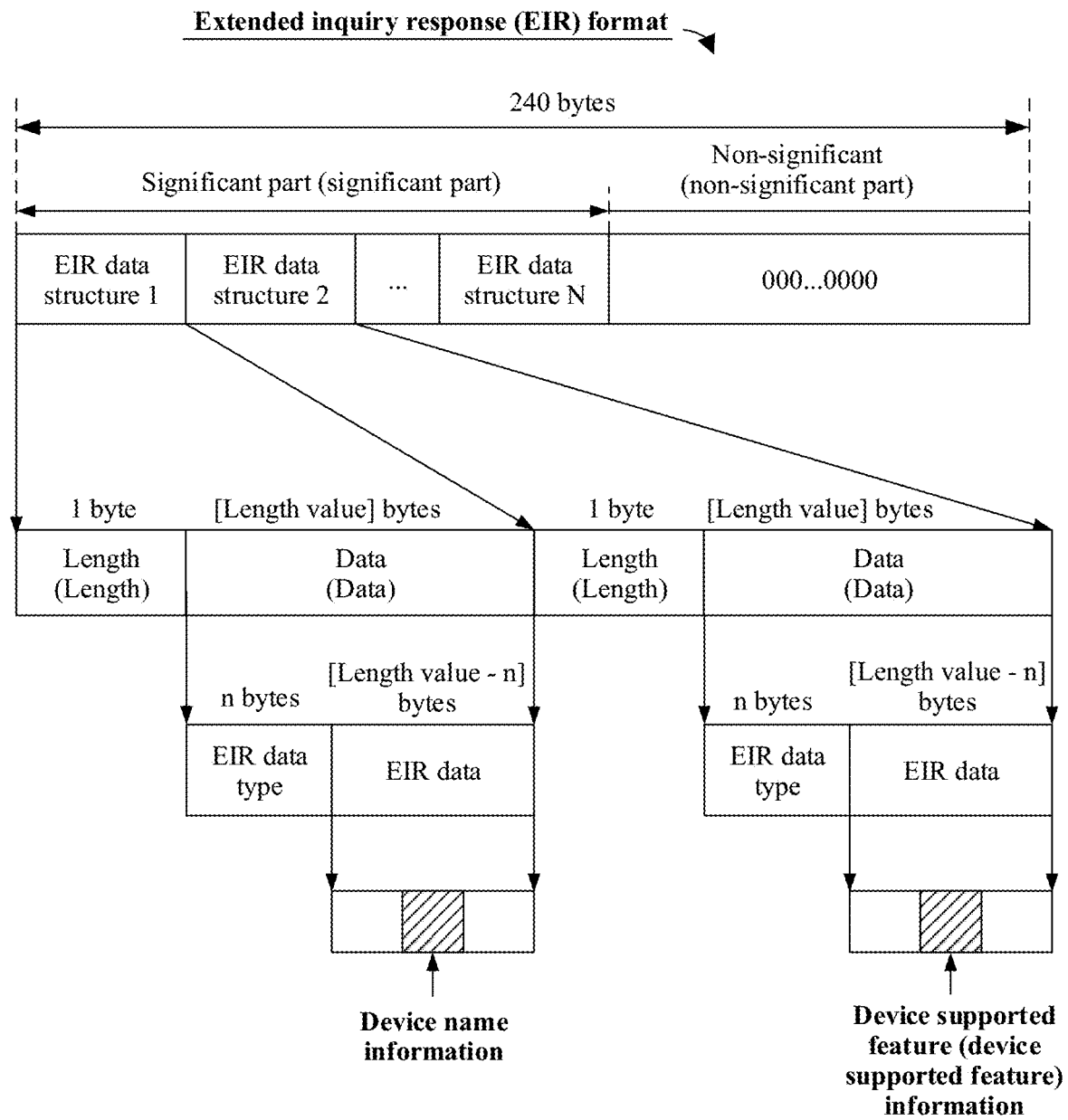
FIG. 7 is a schematic diagram of a format of an extended inquiry response according to an embodiment of this application.

For a format of the extended inquiry response, refer to FIG. 7.

As shown in FIG. 7, the EIR may include 240-byte data. The 240-byte data may include a significant part and a non-significant part. The significant part includes N extended inquiry response data structures (EIR data structures), where N is a positive integer. The non-significant part is filled with 0s.

Each EIR data structure may include a length field and a data field. A value of the length field indicates a length of the data field. For example, if a value of the length field is "0x03", it indicates that the length of the data field is three bytes. The foregoing examples are only used to explain this application, and do not constitute any limitation.

The data field may include an extended inquiry response data type (EIR data type) field and an extended inquiry response data (EIR data) field. The EIR data type field may occupy n bytes, where n is a positive integer. The length of the EIR data field is equal to the value of the length field minus the byte length of the EIR data type.

The EIR data type may include a service universally unique identifier (service UUID), a local device name (local name), a flag, manufacturer specific data, a transmit power level (TX power level), a uniform resource identifier, and the like.

In this embodiment of this application, the EIR carries the device name and the device supported feature information of the Bluetooth device 200. For example, as shown in FIG. 7, in EIR data structure 1, the EIR data type of the EIR data structure 1 may be a local device name, and the EIR data field of the EIR data structure 1 includes the device name of the Bluetooth device 200, for example, "HUAWEI Free Buds". In EIR data structure 2, an EIR data type of the EIR data structure 2 may be manufacturer specific data, and an EIR data field of the EIR data structure 2 includes the device supported feature information of the Bluetooth device 200. The device-supported feature information may include whether the Bluetooth device 200 supports the following features: 3 slot packets, 5 slot packets, encryption slot, timing accuracy, role switch, and hold mode, sniff mode, power control request, channel quality driven data rate (CQDDR), synchronous connection oriented link, secure simple pairing, and the like.

For descriptions of device-supported features, refer to the device feature part in the Bluetooth protocol Core 5.0 Vol2 Part C. Details are not described herein again.

After the terminal 100 receives the extended inquiry response (EIR) returned by the Bluetooth device 200, the terminal 100 may obtain the device name of the Bluetooth device 200 from the EIR, to display the device name in the available device list on the Bluetooth setting interface of the terminal 100.

Figure 6E:
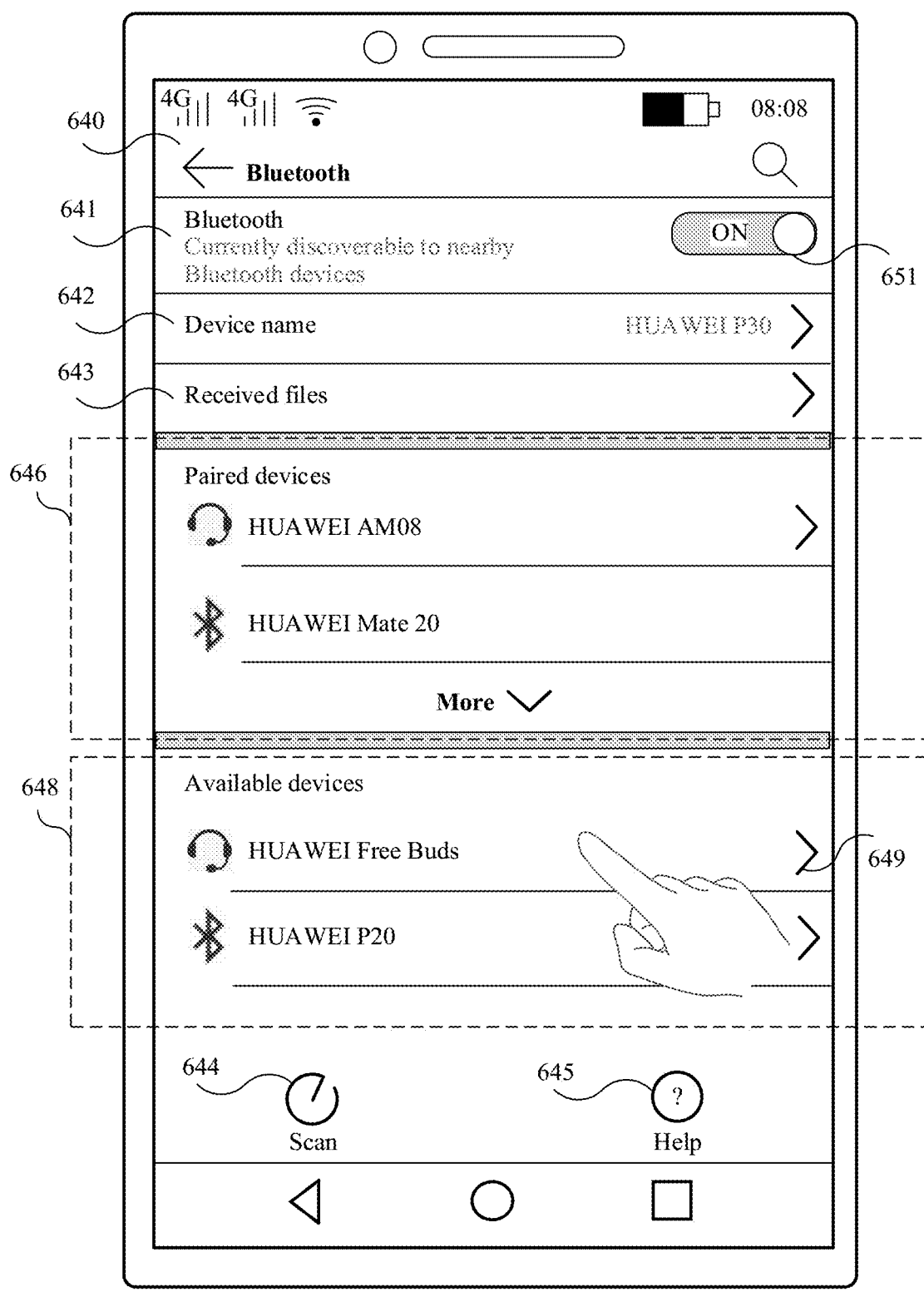

For example, as shown in FIG. 6E, after the terminal 100 enables the Bluetooth function, the terminal 100 may display a paired device list 646 and an available device list 648. The paired device list may display one or more paired device options (for example, a "HUAWEI AM08" device option or a "HUAWEI Mate 20" device option). After obtaining the device name of the Bluetooth device 200, the terminal 100 may display a device option 649 corresponding to the Bluetooth device 200 in the available device list 648. The device option 649 displays the device name of the Bluetooth device 200 (for example, the device name of the Bluetooth device 200 may be "HUAWEI Free Buds").

S504: The terminal 100 pages the Bluetooth device 200.

As shown in FIG. 6E, the terminal 100 may receive a selection operation (for example, tapping) performed by the user on the device option 649 corresponding to the Bluetooth device 200 in the available device list 648. In response to the selection operation, the terminal 100 may perform carrier frequency hopping based on a paging hopping sequence, and send a page request to the Bluetooth device 200 in a sending interval, to request the Bluetooth device 200 to join a piconet where the terminal 100 is located. The paging hopping sequence is generated by using 28 least significant bits of the Bluetooth address of the paged device.

In this embodiment of this application, an operation of triggering the terminal 100 to page the Bluetooth device 200 may be referred to as a second operation (for example, a selection operation on the device option 649 corresponding to the Bluetooth device 200 shown in FIG. 6E).

S505: The Bluetooth device 200 returns a page response to the terminal 100.

The Bluetooth device 200 may listen for a page request of the terminal 100 at a specific hopping frequency in a fixed time window at a regular interval. After detecting the page request sent by the terminal 100, the Bluetooth device 200 may send a secondary device page response (slave page response) to the terminal 100 in a next interval. After receiving the secondary device page response from the Bluetooth device 200, the terminal 100 may send a master device page response (master page response) to the Bluetooth device 200 in a next interval.

After receiving the master device page response sent by the terminal 100, the Bluetooth device 200 may enter a connected state, automatically become a secondary device of the piconet, and return another secondary device page response to the terminal 100. After receiving the secondary device page response sent by the Bluetooth device 200, the terminal 100 may enter a connected state and automatically become a master device of the piconet. In the connected state, each communication party of the terminal 100 and the Bluetooth device 200 hops to a frequency channel at a specified interval (for example, 625 microseconds). In the connected state, a channel hopping sequence used by both communication parties of the terminal 100 and the Bluetooth device 200 is generated by 28 least significant bits of the Bluetooth address of the terminal 100.

S506: The terminal 100 establishes an ACL connection to the Bluetooth device 200.

After completing paging with the Bluetooth device 200, the terminal 100 may establish the ACL connection. After the ACL connection is established, a logical link control and adaptation protocol (L2CAP) signaling channel (channel ID CID=0x0001) between the terminal 100 and the Bluetooth device 200 exists. The terminal 100 and the Bluetooth device 200 may transmit control signaling and some data over the L2CAP signaling channel. The terminal 100 may establish an L2CAP connection to the Bluetooth device 200 through the L2CAP signaling channel.

S507: The terminal 100 performs pairing with the Bluetooth device 200.

The pairing between the terminal 100 and the Bluetooth device 200 may be link manager protocol (LMP) pairing, secure simple pairing (SSP), or another non-standard pairing. After the pairing between the terminal 100 and the Bluetooth device 200 is completed, a shared key, that is, a link key (link key) may be created. The link key can be used for mutual authentication between devices and encrypt data to be exchanged.

Figure 6F:
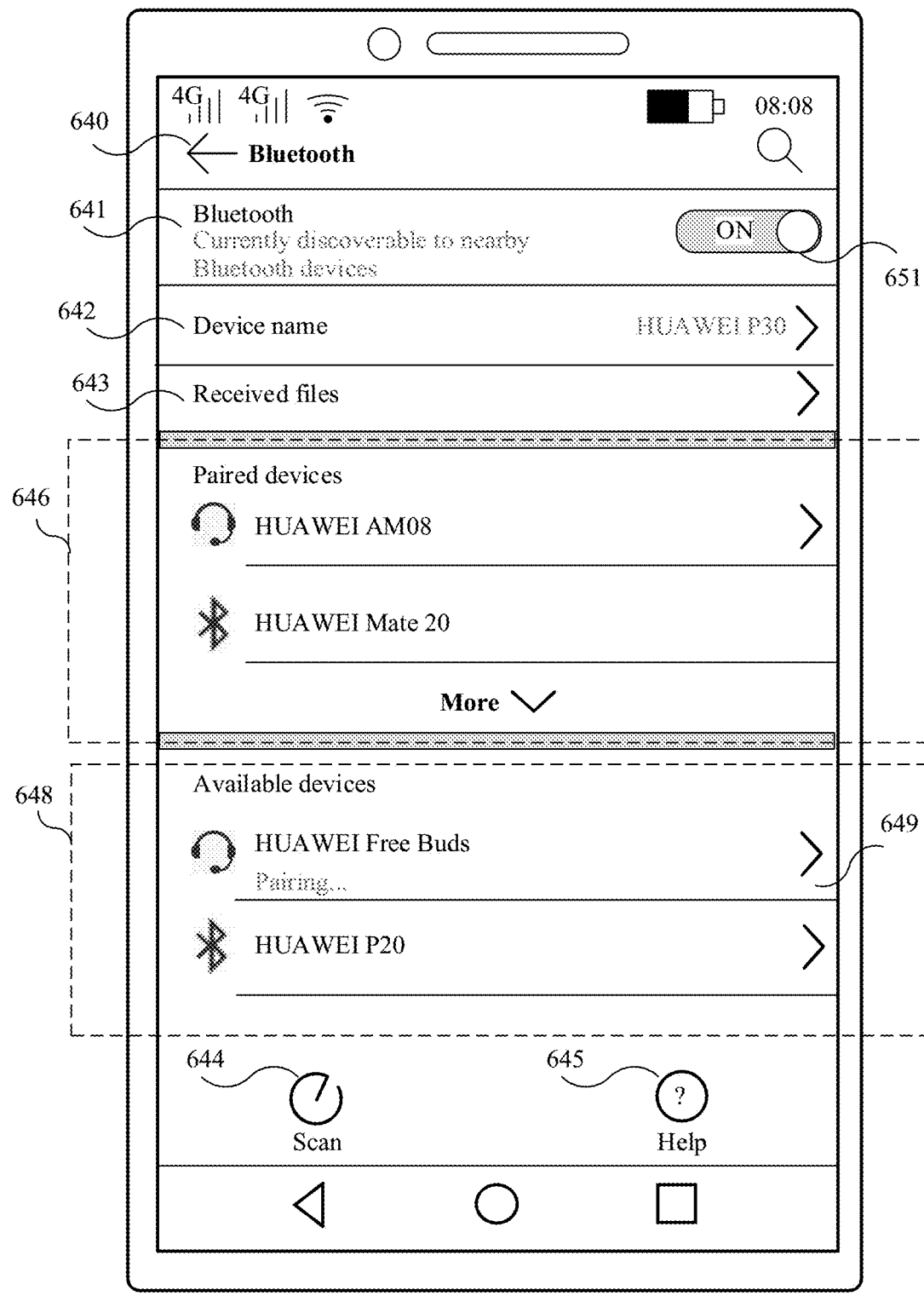

As shown in FIG. 6F, when the terminal 100 is pairing with the Bluetooth device 200, the terminal 100 may display text information "Pairing . . . " on the device option 649, to indicate that the terminal 100 is currently pairing with the Bluetooth device 200.

After the terminal 100 is paired with the Bluetooth device 200, the terminal 100 and the Bluetooth device 200 share a same link key. Then, the terminal 100 and the Bluetooth device 200 may use the link key to perform identity authentication. After the identity authentication is completed, the terminal 100 and the Bluetooth device 200 may derive an encryption key by using the link key and a random number that is exchanged recently before encrypted communication. Then, the terminal 100 and the Bluetooth device 200 may encrypt, by using the encryption key, data to be transmitted between the two communication parties.

The following describes an LMP pairing procedure in this embodiment of this application.

1. Generate an initial key kinit.

The length of the initial key is 128 bits generated by the E22 algorithm.

The input (plaintext) of the E22 algorithm consists of the following three parts: physical address BD_ADDR of a peer device, PIN code and its length, and 128-bit random number IN_RAND.

Before the initial key is generated, the master device obtains the address (BD_ADDRB) of the secondary device in inquiry mode. The address of the master device is BD_ADDRA.

The PIN code is preset by both devices (the master device and the secondary device), for example, "0000" or "1234".

The random number IN_RAND is generated by the master device and transmitted to the secondary device in plain text.

The master and secondary devices use the same E22 algorithm. If the values of the three parts are the same, the initial keys calculated by the two devices should be the same.

2. Generate a link key Kab.

After the initial key is generated, the master device generates a 128-bit random number Link_RandA, and the secondary device also generates a 128-bit random number Link_RandB. In the master device, the master device performs a bitwise logical exclusive OR operation on the initial key and Link_RandA, and sends an exclusive OR result to the secondary device. Similarly, in the secondary device, the secondary device performs a bitwise exclusive OR operation on the initial key and Link_RandB, and sends an exclusive OR result to the master device.

The master device may perform an operation according to the exclusive OR result sent by the secondary device and the initial key stored locally to obtain Link_RandB. The secondary device may perform an operation according to the exclusive OR result sent by the master device and the locally stored initial key to obtain Link_RandA. In this way, the master device and the secondary device have the same initial key, Link_RandA, and Link_RandB.

The master device may perform an encryption operation on Link_RandA and BD_ADDRA to obtain Link_KA, and perform an encryption operation on Link_RandB and BD_ADDRB to obtain Link_KB by using an algorithm (for example, the E21 algorithm). Then, the master device may perform an exclusive OR operation on Link_KA and Link_KB to obtain Kab.

Similarly, the secondary device may perform an encryption operation on Link_RandA and BD_ADDRA to obtain Link_KA, and perform an encryption operation on Link- _RandB and BD_ADDRB to obtain Link_KB by using an algorithm (for example, the E21 algorithm). Then, the secondary device may perform an exclusive OR operation on Link_KA and Link_KB to obtain Kab.

3. The master and secondary devices perform two-way authentication.

A two-way authentication challenge-response manner is used. The master device may be a responder, and the secondary device may be a requester. The responder may generate a 128-bit random number AU_RANDA and send the random number in plain text to the requester. The responder and the requester use the E1 algorithm to encrypt AU_RANDA, Kab, and BD_RANDB to generate their respective 32-bit SRESA and SRESB. The SRESA is generated by the master device as the responder, and the SRESB is generated by the secondary device as the requester. The requester sends the SRESB to the responder. The responder compares the SRESA with the SRESB. If they are the same, the authentication is successful. Otherwise, the authentication fails. After the authentication is complete, the roles of the master device and the secondary device are switched. The master device functions as the requester, and the secondary device functions as the responder. The authentication is performed in the same way.

The terminal 100 and the Bluetooth device 200 may derive an encryption key by using the link key Kab and a random number that is exchanged recently before encrypted communication. Then, the terminal 100 and the Bluetooth device 200 may encrypt, by using the encryption key, data to be transmitted between the two communication parties.

Figure 6G:
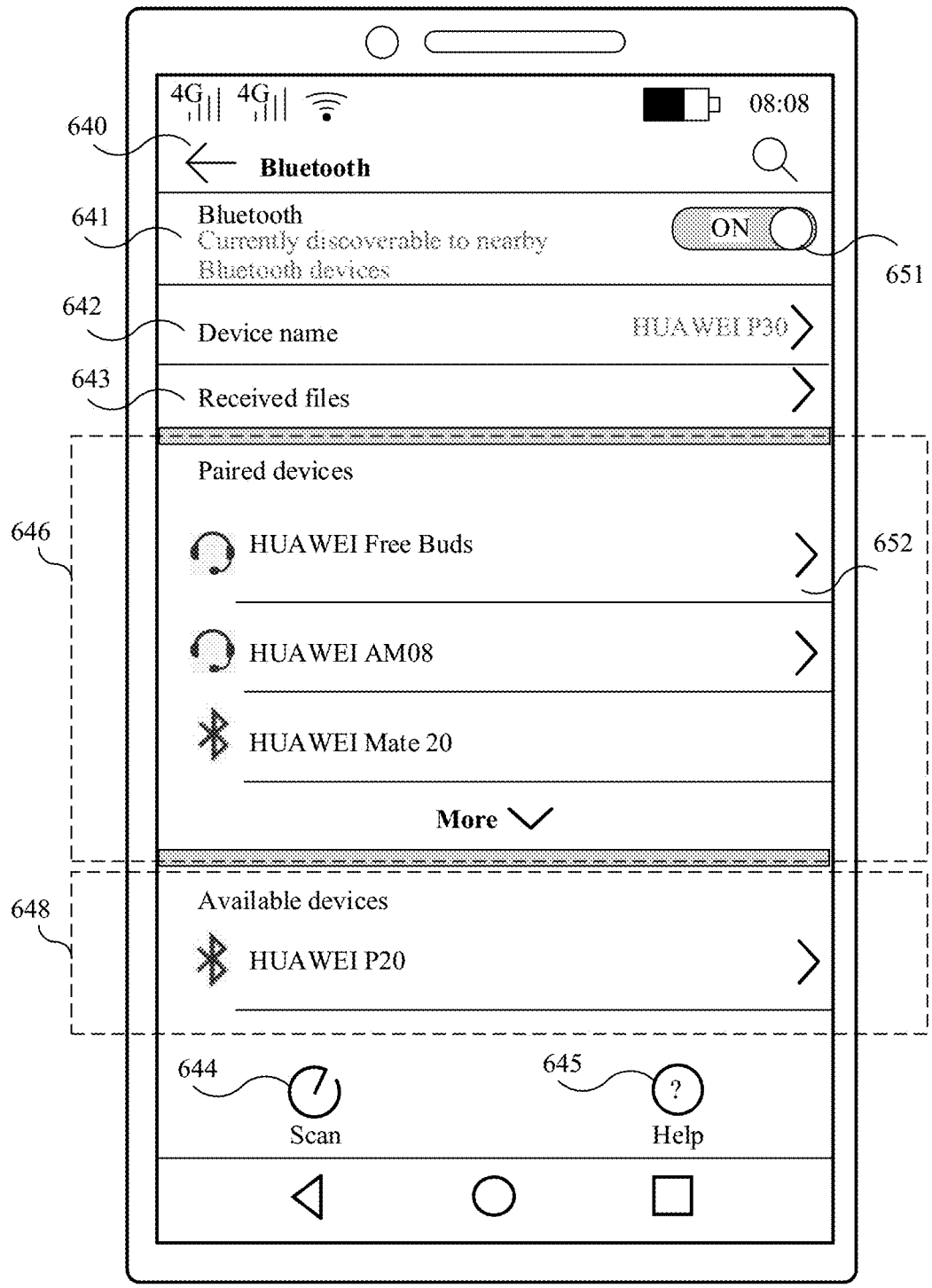

As shown in FIG. 6G, after authentication for pairing between the terminal 100 and the Bluetooth device 200 is completed, the terminal 100 may display a device option 652 of the Bluetooth device 200 in the paired device list 646. The device option 652 of the Bluetooth device 200 may display "paired for calls and media audio".

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A Bluetooth pairing method applied to a Bluetooth system comprising a terminal and a Bluetooth device, the method comprising:
when the terminal receives a first operation of a user, sending, by the terminal, an inquiry request to the Bluetooth device, wherein the inquiry request is used to obtain a Bluetooth address of the Bluetooth device;
after receiving the inquiry request, sending, by the Bluetooth device, an inquiry response to the terminal, wherein the inquiry response comprises the Bluetooth address of the Bluetooth device;
sending, by the Bluetooth device, an extended inquiry response to the terminal, wherein the extended inquiry response comprises a device name of the Bluetooth device; and
after receiving the extended inquiry response, displaying, by the terminal, the device name of the Bluetooth device
wherein the method further comprises:
receiving, by the terminal, a second operation of the user;
sending, by the terminal, a page request to the Bluetooth device in response to the second operation;
after receiving the page request, sending, by the Bluetooth device, a first secondary device response to the terminal;
after receiving the first secondary device response, sending, by the terminal, a master device response to the Bluetooth device;
switching, by the Bluetooth device, to a connected state based on the received master device response, and sending a second secondary device response to the terminal; and
switching, by the terminal, to a connected state based on the received second secondary device response.

2. The method according to claim 1, wherein the extended inquiry response further comprises information about a feature supported by the Bluetooth device.

3. The method according to claim 2, wherein the information about the feature supported by the Bluetooth device comprises secure simple pairing, 3-slot packet transmission, 5-slot packet transmission, timing accuracy, or synchronous connection oriented link.

4. The method according to claim 2, wherein the extended inquiry response comprises a first extended inquiry response data structure (EIR data structure) and a second EIR data structure, the first EIR data structure comprises the device name of the Bluetooth device, and the second EIR data structure comprises the information about the feature supported by the Bluetooth device.

5. The method according to claim 1, wherein the method further comprises:
after the terminal enters the connected state, completing, by the terminal, pairing with the Bluetooth device.

6. A Bluetooth system comprising:
a terminal and a Bluetooth device, wherein
the terminal is configured to send an inquiry request to the Bluetooth device after receiving a first operation of a user, wherein the inquiry request is used to obtain a Bluetooth address of the Bluetooth device;
the Bluetooth device is configured to send an inquiry response to the terminal after receiving the inquiry request, wherein the inquiry response comprises the Bluetooth address of the Bluetooth device;
the Bluetooth device is further configured to send an extended inquiry response to the terminal, wherein the extended inquiry response comprises a device name of the Bluetooth device; and
the terminal is further configured to display the device name of the Bluetooth device after receiving the extended inquiry response;
wherein the terminal is further configured to receive a second operation of the user;
the terminal is further configured to send a page request to the Bluetooth device in response to the second operation;
the Bluetooth device is further configured to send a first secondary device page in response to the terminal after receiving the page request;
the terminal is further configured to send a master device page response to the Bluetooth device after receiving the first secondary device page response;
the Bluetooth device is further configured to switch to a connected state based on the received master device page response, and send a second secondary device response to the terminal; and the terminal is further configured to switch to a connected state based on the received second secondary device response.

7. The Bluetooth system according to claim 6, wherein the extended inquiry response further comprises information about a feature supported by the Bluetooth device.

8. The Bluetooth system according to claim 7, wherein the information about the feature supported by the Bluetooth device comprises secure simple pairing, 3-slot packet transmission, 5-slot packet transmission, timing accuracy, or synchronous connection oriented link.

9. The Bluetooth system according to claim 7, wherein the extended inquiry response comprises a first extended inquiry response data structure (EIR data structure) and a second EIR data structure, the first EIR data structure comprises the device name of the Bluetooth device, and the second EIR data structure comprises the information about the feature supported by the Bluetooth device.

10. The Bluetooth system according to claim 6, wherein the terminal is further configured to:
complete pairing with the Bluetooth device after the terminal enters the connected state.

11. A terminal comprising:
a Bluetooth chip, a memory, a touchscreen, and a processor coupled to the memory; wherein
the touchscreen is configured to receive a first operation of a user;
the processor is configured to, in response to the first operation received by the touchscreen, indicate to the Bluetooth chip to send an inquiry request to a Bluetooth device, wherein the inquiry request is used to obtain a Bluetooth address of the Bluetooth device;
the Bluetooth chip is configured to receive an inquiry response sent by the Bluetooth device, wherein the inquiry response comprises the Bluetooth address of the Bluetooth device;
the Bluetooth chip is further configured to receive an extended inquiry response sent by the Bluetooth device, wherein the extended inquiry response comprises a device name of the Bluetooth device; and
the processor is further configured to, after the Bluetooth chip receives the extended inquiry response, indicate to the touchscreen to display the device name of the Bluetooth device;

wherein the touchscreen is further configured to receive a second operation of the user;
the processor is further configured to, in response to the second operation received by the touchscreen, indicate to the Bluetooth chip to send a page request to the Bluetooth device;
the Bluetooth chip is further configured to receive a first secondary device page response sent by the Bluetooth device after the Bluetooth device receives the page request;
the Bluetooth chip is further configured to send a master device page response to the Bluetooth device after receiving the first secondary device page response, wherein the first secondary device page response is used for the Bluetooth device to switch to a connected state;
the Bluetooth chip is further configured to: receive a second secondary device response sent by the Bluetooth device after the Bluetooth device switches to the connected state; and
the Bluetooth chip is further configured to switch to a connected state based on the received second secondary device response.

12. The terminal according to claim 11, wherein the extended inquiry response further comprises information about a feature supported by the Bluetooth device.

13. The terminal according to claim 12, wherein the information about the feature supported by the Bluetooth device comprises secure simple pairing, 3-slot packet transmission, 5-slot packet transmission, timing accuracy, or synchronous connection oriented link.

14. The terminal according to claim 12, wherein the extended inquiry response comprises a first extended inquiry response data structure (EIR data structure) and a second EIR data structure, the first EIR data structure comprises the device name of the Bluetooth device, and the second EIR data structure comprises the information about the feature supported by the Bluetooth device.

15. The terminal according to claim 11, wherein the Bluetooth chip is further configured to:
complete pairing with the Bluetooth device after the terminal enters the connected state.

* * * * *

UNITED STATES PATENT AND TRADEMARK OFFICE
CERTIFICATE OF CORRECTION

PATENT NO. : 11,844,119 B2
APPLICATION NO. : 17/640435
DATED : December 12, 2023
INVENTOR(S) : Yuhong Zhu et al.

It is certified that error appears in the above-identified patent and that said Letters Patent is hereby corrected as shown below:

In the Claims

In Column 27, Line 66, in Claim 1, delete "device" and insert -- device; --.

Signed and Sealed this
Twentieth Day of February, 2024

Katherine Kelly Vidal
*Director of the United States Patent and Trademark Office*